United States Patent
Kalachev et al.

(10) Patent No.: US 11,912,304 B1
(45) Date of Patent: Feb. 27, 2024

(54) SYSTEM TO MAINTAIN A DOCK LOCATION OF AN AUTONOMOUS MOBILE DEVICE

(71) Applicant: AMAZON TECHNOLOGIES, INC., Seattle, WA (US)

(72) Inventors: Anton Kalachev, Burlingame, CA (US); Xiaoxu Liu, Mountain View, CA (US); Richard W. Kim, San Ramon, CA (US); Anthony George Robson, Los Altos, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 173 days.

(21) Appl. No.: 17/445,861

(22) Filed: Aug. 25, 2021

(51) Int. Cl.
  *G05D 1/00* (2006.01)
  *G05D 1/02* (2020.01)
  *B60L 53/36* (2019.01)
  *B60W 60/00* (2020.01)

(52) U.S. Cl.
  CPC ....... *B60W 60/0011* (2020.02); *G05D 1/0088* (2013.01); *G05D 1/0225* (2013.01); *G05D 1/0274* (2013.01); *B60L 53/36* (2019.02)

(58) Field of Classification Search
  CPC ............. B60W 60/0011; G05D 1/0088; G05D 1/0225; G05D 1/0274; B60L 53/36
  See application file for complete search history.

(56) References Cited

U.S. PATENT DOCUMENTS

| | | | |
|---|---|---|---|
| 2017/0113342 A1* | 4/2017 | Abramson | B25J 9/0003 |
| 2018/0192845 A1* | 7/2018 | Gu | A47L 11/4091 |
| 2019/0369640 A1* | 12/2019 | He | G01S 19/41 |
| 2020/0249688 A1* | 8/2020 | Caussy | H02J 7/00034 |
| 2021/0393099 A1* | 12/2021 | Zhao | A47L 11/4005 |

FOREIGN PATENT DOCUMENTS

CN   112083718 A   * 12/2020   ........... G05D 1/0246

OTHER PUBLICATIONS

Chen, machine translation of CN-112083718-A (Year: 2020).*

* cited by examiner

*Primary Examiner* — Anne Marie Antonucci
*Assistant Examiner* — Patrick Daniel Mohl
(74) *Attorney, Agent, or Firm* — Lindauer Law, PLLC

(57) ABSTRACT

An autonomous mobile device (AMD) moves in a physical space and uses a dock located at a first pose. Sometimes a user may move the dock. To determine whether the dock has moved, the AMD compares first pose data that was previously obtained while at the dock in the first pose to second pose data, such as after a restart or after leaving the dock. If a difference between the first pose and the second pose is greater than a threshold, the dock has moved. The pose data may be determined using a simultaneous localization and mapping (SLAM) algorithm to process images from cameras on the AMD. Transform data that relates coordinates of the second pose to coordinates of the first pose may be determined. If the dock is used as an origin for a map of the physical space, the transform data may be used to update the map.

20 Claims, 7 Drawing Sheets

SYSTEM TO MAINTAIN A DOCK LOCATION OF AN AUTONOMOUS MOBILE DEVICE

BACKGROUND

Every day, a user faces a variety of tasks both personal and professional that need to be attended to. These may include helping in the care of others, such as children or the elderly, working from home, taking care of the home, staying in contact with others, and so forth. Devices that assist in these tasks may help the user perform these tasks better or may allow the user time to attend to other tasks.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
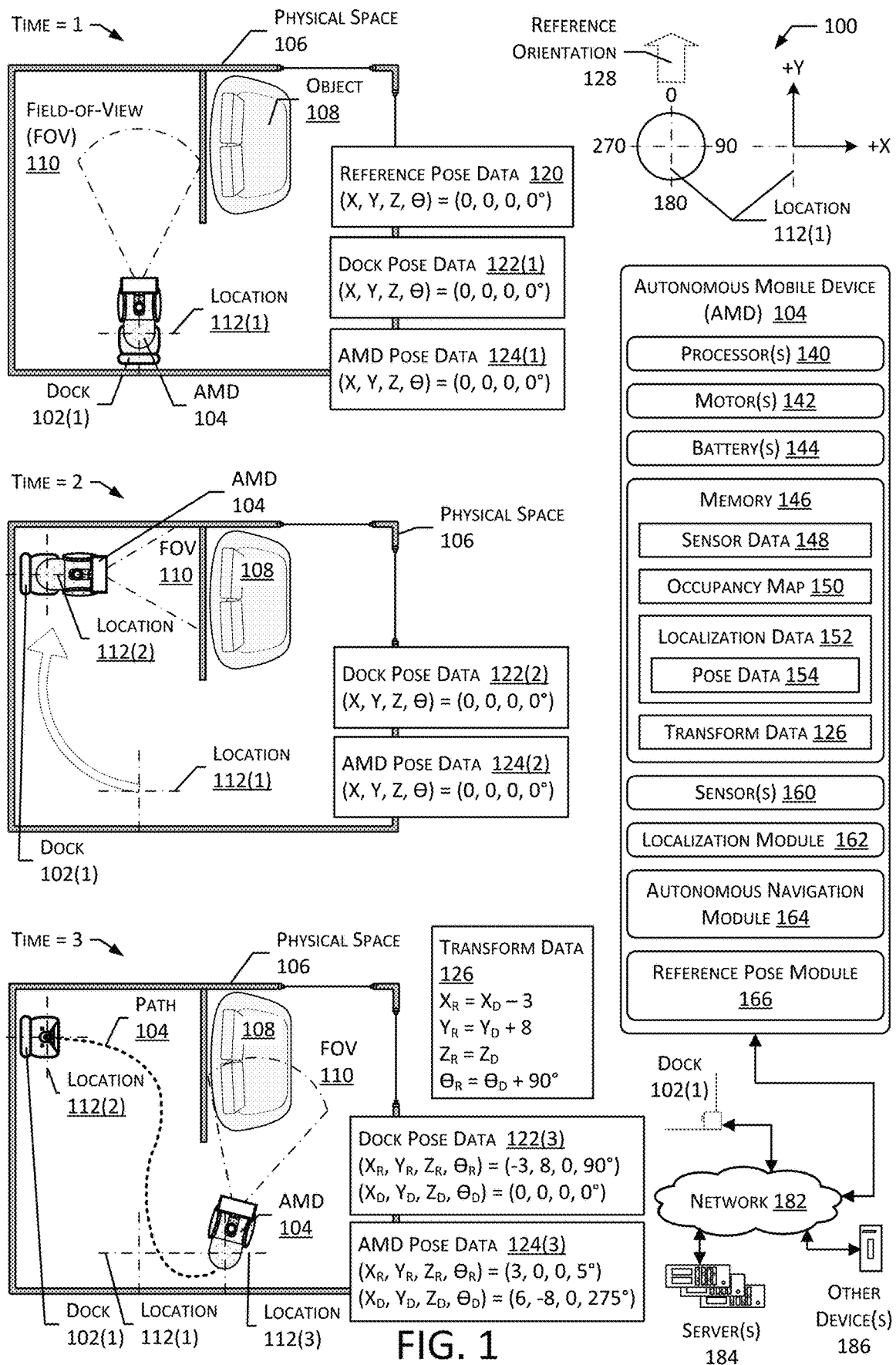
FIG. 1 illustrates a system to maintain a reference pose for an Autonomous Mobile Device (AMD), according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) is capable of autonomous movement from one location in a physical space to another location without being controlled by a user. A user may interact with the AMD and the AMD may perform tasks that involve moving in the physical space, displaying information, accepting input, and so forth. The AMD may use a dock to recharge its batteries, replenish consumable materials, as a place to be safely out of the way when not in use, or for other functions. A failure of the ability to return to the dock may render the AMD unusable. For example, if the AMD is unable to return to the dock the onboard batteries may be depleted and render the AMD inoperative.

Traditionally, a dock provides a signal or other guidance to assist the device in returning to the dock. For example, a traditional dock may emit signals that serve as a beacon for the device to detect and navigate to the dock. However, this approach adds hardware and associated costs to the dock. This also results in ongoing power consumption to operate the electronics that emit the signal for the device. Such power consumption may violate standards or laws that limit the amount of energy drawn by electronic devices.

During operation, the AMD determines its pose at various times. The pose specifies a location in the physical space and an orientation with respect to that space. To navigate between locations in the physical space, the AMD may use a map of the physical space. The map may specify dimensions of different areas of the physical space and locations and sizes of objects within the physical space. The map may specify the areas and objects using coordinates relative to an origin defined by a reference pose. A reference pose may be an arbitrary location and an arbitrary orientation with respect to the physical space. For example, a pose of the AMD while at the dock may be used as the reference pose.

Described in this disclosure are techniques for an AMD to determine when a dock has been moved and to determine transform data that relates coordinates of a new dock pose to coordinates of a prior dock pose, relates the new dock pose to the reference pose used by the map of a physical space, or relates the new dock pose to some other pose. These techniques may be implemented by the AMD and may be used with a dock that is a passive device that does not emit a signal.

A dock and an inactive AMD may be moved from a first dock pose to a second dock pose. The AMD, upon reactivation, assumes it is starting at the first dock pose. The AMD attempts to determine where it is in the physical space, known as localization, using sensor data. For example, images from camera(s) on the AMD may be processed by a simultaneous localization and mapping (SLAM) algorithm to determine localization data indicative of a pose of the AMD based on features depicted in those images. If the AMD is able to determine localization data with sufficient confidence while at the second dock pose, it may determine the variance between the previously stored first dock pose and the current second dock pose is large enough to indicate the dock has been moved.

In response to determining that the dock has moved from a first dock pose to a second dock pose, the AMD determines transform data that relates the second dock pose to the first dock pose. This transform data may be used to update the map, replacing the first dock pose with the second dock pose as the reference pose. This allows the previously determined map to continue to be used after the dock has been moved.

Sometimes the AMD may have insufficient features to determine its pose with high confidence while at the dock. For example, the dock may have been moved into an alcove where the AMD's sensors are acquiring images of a featureless wall. Sometimes the AMD may have determined incorrect localization data while in the dock at the second dock pose. For example, the dock may have been moved from a spot facing a featureless wall to a different spot that also happens to face another featureless wall.

The AMD may then begin moving through the physical space, away from the second dock pose. At different poses in the physical space, the AMD attempts to determine localization data based on the features that may come into view as a result of the change in pose due to its movement. Eventually, the AMD may determine localization data with a high confidence level using the SLAM algorithm to provide a localization-based pose. Based on the localization-based pose, the AMD is able to determine that the second dock pose is inconsistent with the first dock pose. Based on this inconsistency, the AMD determines that the dock has been moved. As a result, the AMD determines transform data that relates the second dock pose to the first dock pose.

The transform data may relate coordinates that are relative to the second dock pose to coordinates that are relative to the reference pose. By using the transform data is the AMD retains the ability to use the dock as an origin or reference pose even after the dock has moved.

In some implementations a user may provide an instruction to the AMD to find a dock that has been moved, the AMD may request assistance from the user to find the dock, and so forth. Once the dock has been found by the AMD, the transform data may be determined.

The techniques described allow the AMD to maintain a consistent reference pose after moving a reference object in the physical space, such as a dock. These techniques are usable with a passive dock that does not send a signal to the AMD. Because the dock is not an active participant, the dock may be relatively inexpensive. Additionally, power consumption of the dock is substantially reduced compared to a dock that emits a signal. Such power reduction allows the dock to comply with local standards or laws.

ILLUSTRATIVE SYSTEM

FIG. 1 illustrates a system 100 to maintain a reference pose for an Autonomous Mobile Device (AMD), according to some implementations.

In this example, the AMD 104 is depicted at three different times within a physical space 106. Over the three different times, the AMD 104 determines that a dock 102(1) has moved and determines transform data that relates a new dock pose with a reference pose. The reference pose indicates a coordinate origin location 112(1) and reference orientation 128 used to build a map of the physical space 106. The first time, time =1, illustrates a first location of a dock 102(1). The dock 102(1) has a first pose that matches the reference pose. The second time, time=2, illustrates a second location of the dock 102(1). At the second time, the AMD 104 has a presumption that the dock pose matches the reference pose. The third time, time=3, illustrates the AMD 104 localizing with respect to a map of the physical space 106 and determining that the dock 102(1) has moved based on the dock 102(1) having a second pose that does not match the reference pose. Based on a difference between pose data based on the dock pose and pose data based on the reference pose, the reference pose module 166 may determine transform data that relates coordinates relative to the dock pose into coordinates relative to the reference pose.

In some implementations, the localization module 162 determines localization data based on one or more of: sensor data, motor encoder data, wheel odometry, inertial measurement units, or a global positioning system. The localization data may be determined periodically or in response to determined sensor data. For example, as sensor data is determined and processed to identify features or other characteristics of a physical space, the AMD 104 may determine localization data. As used in the following examples, reliable localization is indicative of determining localization data that is associated with a localization confidence value that is greater than a confidence threshold. The localization data may have a localization confidence value that is dependent upon a number of features of a physical space determined from sensor data, statistical analysis of data processed by the SLAM module, and so forth. Determining a localization confidence value based on a number of features in a physical space is described in the following examples.

In some examples, the AMD 104 determines the transform data in response to reliably localizing, where reliably localizing is associated with determining localization data having a localization confidence value that is above a confidence threshold. In this example, if the localization confidence value is less than or equal to the confidence threshold, then the localization data may not be considered reliable. If the localization confidence value is greater than the confidence threshold, then the localization data may be considered reliable, and in response, the AMD 104 may determine transform data.

In the following example, there are two coordinate systems, a first coordinate system that is relative to the reference pose, and a second coordinate system that is relative to a dock pose. After the AMD 104 launches from the dock 102(1), the AMD 104 may determine pose data relative to the dock 102(1) until the AMD 104 reliably localizes. After the AMD 104 reliably localizes with respect to the reference pose, the AMD 104 then determines a pose for the dock 102(1) relative to the reference pose. Based on the pose of the dock 102(1) relative to the reference pose, the AMD 104 determines transform data that relates coordinates relative to the second coordinate system into coordinates relative to the first coordinate system.

As described in the following examples, the AMD 104 determines whether a dock 102(1) has moved and as a result determines transform data that relates coordinates relative to the dock pose at a new pose to coordinates relative to the reference pose. In some implementations, the AMD 104 may be notified that the dock 102(1) has been moved. For example, the AMD 104 may receive user input indicating to the AMD 104 that the dock 102(1) is at a particular location within the physical space 106. In some cases, the user may utter, "Robot, the dock is now in the kitchen." The occupancy map 150 may be associated with metadata indicating labels for various portions of the physical space 106, where the label may include the physical area indicated by a user, such as "kitchen". In other examples, labels may be a "pantry", "living room", "front bedroom", and so forth. In some examples, user input may indicate a relative location to the AMD 104. For example, a user may utter, "Robot, the dock is back where it used to be," "Robot, the dock is here," or "Robot, the dock is by the back door."

In some implementations, if the AMD 104 is unable to locate the dock 102(1), the AMD 104 may request assistance from a user. For example, in some of the following examples, the AMD 104 attempts to find the dock 102(1) if the AMD 104 returns to the location previously associated with the dock 102(1) and the dock 102(1) is no longer present. If, after a threshold period of time searching or at a threshold amount of remaining battery power, the AMD has not located the dock 102(1), the AMD 104 may request user assistance. For example, the AMD 104 may use one or more speakers to generate audio indicating that assistance is needed finding the dock 102(1). As another example, the AMD 104 may display a message on a display indicating that assistance is needed finding the dock 102(1). In some examples, if the AMD 104 returns to the dock 102(1)

location and determines that the dock 102(1) has moved, then before searching the AMD 104 may request assistance from a user.

At the first time, the AMD 104 is docked and the dock 102(1) is located at a first location 112(1). The first location 112(1) and the first orientation of the dock 102(1) matches the reference location and reference orientation 128 of the reference pose. The reference pose may be an arbitrary location and an arbitrary orientation in the physical space 106. In this example, the reference pose is based on a pose of the dock 102(1) at particular time. The particular time may be when the dock 102(1) is installed and the AMD 104 launches from the dock 102(1) to explore the physical space 106 to determine an occupancy map 150, a feature map, or both an occupancy map 150 and a feature map. In this example, the reference pose remains constant, and an occupancy map 150 and a feature map may be determined with respect to the reference pose. The occupancy map 150 and feature map may indicate objects and features relative to the reference pose.

In some implementations, a dock pose may be a pose of the dock 102(1) at a given location and a given orientation. While the reference pose may remain constant, a dock pose may change if the dock 102(1) is moved. At the first time, the dock pose matches the reference pose. The dock pose matches the reference pose based on being at a same location and being oriented in a same direction. A given pose may be indicative of a particular location with respect to multiple orthogonal axes and rotation with respect to individual ones of the axes. For example, the given pose may comprise six-dimensional information indicative of coordinates in three-dimensional space with respect to a designated origin, and with respect to each of the three axes of three-dimensional space.

In this example, the chassis of the AMD 104 moves over a surface of the physical space 106 and pose data may not be indicative of any tilt or roll relative to the surface. As a result, a pose of the AMD 104 may be specified by four coordinate values: X-Y-Z coordinates indicating a position in three-dimensional space, and a single orientation coordinate (e.g., θ) that indicates an orientation with respect to the X-Y plane. At the first time, the four coordinate values of the dock pose and the reference pose comprise: a coordinate value of 0 meters (m) along the X-axis, a coordinate value of 0 m along the Y-axis, a coordinate value of 0 m along a Z-axis, and a coordinate value indicating an orientation of 0° (zero degrees). A Z-axis coordinate value may be indicative of a height value or elevation value for the AMD 104.

The reference pose orientation may be arbitrary, and in this example, the reference pose orientation is depicted as reference orientation 128. The reference pose location may be arbitrary, and in this example, the reference pose location is depicted by location 112(1). At the first time, the reference pose data 120 indicates a pose of $(X_R, Y_R, Z_R, \theta_R) = (0, 0, 0, 0°)$, and the dock pose data 122(1) indicates a pose of $((X_D, Y_D, Z_D, \theta_D) = (0, 0, 0, 0°)$. At the first time, the AMD 104 may be docked, and the AMD pose data 124(1) indicates (0, 0, 0, 0°). In this example, coordinates relative to the reference pose are indicated by $(X_R, Y_R, Z_R, \theta_R)$, and coordinates relative to the dock pose are indicated by $(X_D, Y_D, Z_D, \theta_D)$. In this example, the physical space 106 includes an object 108. The object 108 is a sofa and may be associated with a set of features determined during the exploration of the physical space 106 by the AMD 104.

The object 108 may be associated with one or more cells of the occupancy map 150, where a cell may be associated with an area of the physical space 106. A cell in an occupancy map 150 may be indicative of a physical area associated with the cell being occupied by an object in the physical space 106. In some implementations, an indication of occupancy may be a probability value, ranging from zero to one. In other implementations, an indication of occupancy may be a first value for occupied, a second value for unoccupied, and a third value for unknown. In this example, the object 108 may be associated with a set of cells, where each cell of the set of cells is associated with X-Y-Z coordinates. The set of cells may be associated with a physical area occupied by the object 108 within the physical space 106.

The object 108 may be associated with one or more features of a feature map. As the AMD 104 explores the physical space 106, the one or more sensors 160 may determine features relative to various poses of the AMD 104. For example, at a first pose, the AMD 104 may have a first set of objects within a sensor field-of-view 110, such as furniture, a door, doorframe, window frame, or some other type of object. From the first pose, the sensors 160 may determine sensor data 148 indicative of the first set of objects within the field-of-view 110. Based on the sensor data 148, the AMD 104 may determine a first set of features such as edges, distance, color, dimensions of some or all of the first set of objects within the field-of-view 110, and so forth.

Continuing this example, the first set of features may be associated with the first pose. From a different pose, a second pose, the same first set of objects may be within the sensor field-of-view 110. While at the second pose, the AMD 104 may determine a second set of features. A same object may have different features depending on a pose from which the object is detected by the AMD 104. For example, an edge of a table leg may be visible from the first pose but not visible from the second pose. In some implementations, the feature map may be searchable using one or more of: data indicative of a pose, data indicative of coordinates of an object, or data indicative of a feature. A feature determined from sensor data 148 may match a stored feature based on one or more characteristics matching above a threshold percentage. For example, if a feature is an edge, then characteristics of the edge may be pixel coordinates within image data of a beginning of the edge, and end of the edge, an orientation of the edge, a thickness of the edge, and so forth.

Each feature of the one or more features may be associated with coordinates relative to the occupancy map 150. A feature may be an edge, a texture, a shape, and so forth. A feature may also be associated with a given pose. For example, a feature may be an edge, and at a given pose, the edge may be a first length at a first orientation. With the AMD 104 at the given pose, the AMD 104 may determine multiple features, where a confidence associated with the given pose may be based on a number of features determined by the AMD 104 while at the given pose. For example, if over a thousand features are associated with a given pose, there may be a localization confidence value associated with the given pose that is greater than a confidence threshold. Localization confidence values are discussed in greater detail later in this example.

In some implementations, the AMD 104 may use the feature map to reliably localize. For example, the AMD 104 may be at a given location and a given orientation in the physical space 106. While at the given location and the given orientation of the AMD 104, the AMD 104 may determine a first set of features based on sensor data 148 from the sensors 160. The AMD 104 may use the feature map to determine a first pose that may be associated with the first set of features. The AMD 104 may then reliably localize to the first pose based on determining that the given location and the given orientation are indicated by the first pose.

The AMD 104 may comprise one or more sensors 160. The one or more sensors 160 may include one or more individual fields-of-view. The sensor field-of-view 110 may comprise an aggregation of the one or more individual fields-of-view. An individual field-of-view may be associated with a portion of the physical space 106 for which sensor data 148 may be determined.

At the second time, time=2, the dock pose has changed relative to the first time. At the second time, the dock 102(1) has been moved from location 112(1) to location 112(2). Also at the second time, the dock has been rotated 90° relative to the reference orientation 128. At the second time, the AMD 104 is docked. In some implementations, if the AMD 104 is docked, then based on a connection to the dock 102(1), the AMD 104 determines a default pose indicated by AMD pose data 124(2) that is relative to the dock pose. In this example, because the AMD 104 is docked, the AMD 104 determines a first AMD pose that is equal to the dock pose. At the second time, the dock pose is indicated by dock pose data 122(2). The dock pose data 122(2) indicates a pose of (0, 0, 0, 0°). Until the AMD 104 has determined that the dock 102(1) has moved, the AMD 104 may determine that the dock pose matches the reference pose.

At the second time, the dock 102(1) has been moved, but the AMD 104 has not yet determined that the dock 102(1) has been moved. Until the AMD 104 has reliably localized, the AMD 104 determines pose data relative to the dock pose, which at the second time is AMD pose data 124(2). The AMD 104 may reliably localize in place while on the dock 102(1) or the AMD 104 may reliably localize after leaving the dock 102(1). After the AMD 104 reliably localizes, the AMD 104 determines that the localization-based pose does not match a pose relative to the dock pose.

At the third time, time=3, the AMD 104 has moved away from the dock 102(1) and is at a location indicated by location 112(3). In this example, the AMD 104 is unable to reliably localize while docked, so the AMD 104 begins to move through the physical space 106. The example where the AMD 104 is able to reliably localize while docked is discussed following this example. In this example, the AMD 104 determined a first pose based on being docked. As the AMD 104 leaves the dock 102(1) and moves, the AMD 104 determines at least a second pose. The first pose and the second pose are relative to the dock pose.

The first pose may be (0, 0, 0, 0°). In this example, from the first pose, the AMD 104 may move 25 centimeters in a direction that is 5° relative to the dock pose. The dock pose indicates that the dock 102(1) is at location 112(2) and having an orientation of 0°. Distance and direction relative to the first pose may be determined using motor encoder data. For example, distance may be determined by motor encoder data indicating an amount of rotation of each wheel of the AMD 104. The amount of rotation, given a wheel radius, may be used to determine a distance traveled by the AMD 104. An orientation relative to a previous location may be determined based on a difference between a first rotation of a first wheel and a second rotation of a second wheel over a distance traveled. In this example, the second pose may indicate (0, 0.25, 0, 5°), where the second pose is relative to the first pose. As the AMD 104 continues to move along a path, the AMD 104 may determine additional poses relative to the first pose.

At location 112(3), the AMD 104 may determine third pose data. For example, the AMD 104 may determine a first set of features based on sensor data 148 associated with the FOV 110 at the third time. The first set of features may be used to determine the third pose data. For example, the first set of features may be used to determine a pose that is associated with the second set of features. The second set of features may be indicated by a feature map, and the second set of features may match the first set of features. In this example, based on a number of matching features between the first set of features and the second set of features, the AMD 104 may determine that a localization confidence value is greater than a confidence threshold. Based on the localization confidence value being greater than the confidence threshold, the AMD 104 reliably localizes and determines the third pose. Determining a localization confidence value based on a number of matching features is discussed in greater detail later in this example.

At the third time, the dock 102(1) relative to the reference pose, has been moved −3 meters along the X-axis, +8 meters along the Y-axis, 0 meters along the Z-axis, and rotated by 90°. In this example, for pose data relative to the dock 102(1) to be transformed into pose data relative to the reference pose, the pose data relative to the dock 102(1) may be transformed using transform data 126. In this example, the transform data may be indicated by the following equation:

$$(X_R, Y_R, Z_R, \theta_R) = (X_D + C_1, Y_D + C_2, Z_D + C_3, \theta_D + C_4). \quad \text{(Equation 1)}$$

In this example, based on the coordinates of location 112(2) relative to location 112(1) and on the rotation of the dock 102(1) relative to the reference pose, $C_1 = -3$, $C_2 = 8$, $C_3 = 0$, and $C_4 = 90°$. $C_1$ is representative of a distance that the dock 102(1) was moved along the X-axis, $C_2$ is representative of a distance that the dock 102(1) was moved along the Y-axis, $C_3$ is representative of a distance that the dock 102(1) was moved along the Z-axis, and $C_4$ is representative of an amount of rotation of the moved dock 102(1).

In some implementations, the transform data 126 may specify a coordinate transform. In this example, the X-Y coordinates relative to the dock pose are aligned with the X-Y coordinates of the reference pose based on the positive numbers of the X-values increasing in a same direction and on the positive numbers of the Y-values increasing in a same direction. In this example, based on the coordinate transform, the dock pose relative to the reference pose is (−3, 8, 0, 90°) which may be transformed to a pose of (0, 0, 0, 0°) that is relative to the reference pose. The transformed dock pose of (0, 0, 0, 0°) matches the reference pose of (0, 0, 0, 0°). Similarly, in this example, the AMD pose data 124(3) relative to the reference pose is (3, 0, 0, 5°) and the AMD pose data 124(3) relative to the dock pose is (6, −8, 0, 275°). The transformed AMD pose data 124(3) is (3, 0, 0, 5°), and is indicative of pose data relative to the reference pose.

Continuing this example, because the third pose is relative to the reference pose, the third pose data may indicate a pose of the AMD 104 at location 112(3) of (3, 0, 0, 5°). Also at location 112(3), because the second pose is relative to the dock 102(1) at location 112(2), the second pose may be (6, −8, 0, 275°). Because the second pose relative to the dock pose, does not match the third pose relative to the reference pose, the AMD 104 may determine that the dock 102(1) has moved away from the reference pose. In this example, the AMD 104 may determine the third pose using the SLAM module. For example, at the third pose, the AMD 104 may determine sensor data 148 comprising one or more images. Based on the images, the AMD 104 may determine a first set of features, such as edges, distance, color, dimensions of some or all of the first set of objects within the field-of-view 110. Based on disparity in apparent location between a stereopair of the images, the AMD 104 may also determine depth data associated with the first set of features. The depth data may be used to determine one or more distances from the AMD 104 to one or more of the first set of features. The AMD 104 may determine a second set of features associated with a feature map of the physical space 106, where the second set of features is based on one or more matches to one or more of the first set of features. Based on coordinate data associated with the second set of features in the feature map and on the one or more distances from the AMD 104 to one or more of the first set of features, the AMD 104 may use the SLAM module to localize with a localization confidence value that is greater than a confidence threshold. Based on reliably localizing, the AMD 104 may determine the location and orientation indicated by the third pose.

In some implementations, a localization confidence value may be determined based on one or more factors such as a number of features determined by the AMD 104 while at a given pose, distinctiveness of those factors, statistical analysis of the data used to determine the localization data, and so forth. For example, if over a threshold number of features are associated with a given pose, then a localization confidence value associated with the given pose may be greater than the confidence threshold. In this example, the threshold number may be one thousand features, but in other examples, the threshold number may be more or less than one thousand features. As the AMD 104 moves through the physical space 106, the SLAM module determines localization data with varying confidence values. In this example, localization data that does not have a localization confidence value greater than the confidence threshold is not used as a basis for determining a coordinate transform.

In response to variances between the first pose and the third pose, the AMD 104 may determine transform data 126. As described earlier, the transform data 126 may be based on movement and rotation of the dock 102(1) relative to the reference pose used as an origin for the occupancy map. As a result, to determine the transform data 126, the reference pose module 166 may determine the X-coordinate transform to be a distance to add to the X-coordinate relative to the dock pose to produce the X-coordinate relative to the reference pose. The distance may be positive or negative. The reference pose module 166 may determine the Y-coordinate transform to be a distance to add to the Y-coordinate relative to the dock pose to produce the Y-coordinate relative to the reference pose. The reference pose module 166 may determine the Z-coordinate transform to be a distance to add to the Z-coordinate relative to the dock pose to produce the Z-coordinate relative to the reference pose. The reference pose module 166 may determine the theta-coordinate transform to be a number of degrees of rotation to add to the theta-coordinate from the theta-coordinate relative to the dock pose to produce the theta-coordinate relative to the reference pose.

In some implementations, after the AMD 104 reliably localizes and determines transform data 126, the AMD 104 returns to the dock 102(1) by applying the transform data 126 to the poses relative to the dock pose that were used to reach the location where the AMD 104 reliably localized. The application of the transform data to the poses used to reach the location where the AMD 104 reliably localized results in one or more transformed poses. The AMD 104 may use the one or more transformed poses as a basis for a path back to the dock 102(1). In some implementations, on returning to a location proximate to where the dock 102(1) is within the FOV 110 of the sensors 160, the AMD 104 may determine sensor data 148. The sensor data 148 may be used to confirm or adjust a location, orientation, or a location and orientation of the dock pose relative to the reference pose. The AMD 104 may dock, and based on a successful docking, the AMD 104 may determine that a transform confidence value for the transform data 126 is greater than a confidence threshold. For example, based on docking, the AMD 104 may set the transform confidence value to be greater than the confidence threshold. If the AMD 104 is unable to dock, then the transform confidence value may be set to a value that is less than or equal to the confidence threshold. In this example, if the transform confidence value is greater than the confidence threshold, then the AMD 104 may reliably use the transform data 126 to calculate transforms between the dock pose and the reference pose.

The AMD 104 may be used within a building that includes more than one floor. In such an example, the AMD 104 may determine occupancy map 150 that is associated with each floor. For example, a first occupancy map 150(1) may be associated with a first floor, a second occupancy map 150(2) with a second floor, and so forth. The occupancy map 150 may be stored within memory 146. At the first time, the AMD 104 may have determined sensor data 148, and a localization module 162 may be used to determine localization data 152, such as first localization data. The first localization data may indicate a physical location of the AMD 104 relative to the first occupancy map 150(1). In some examples, localization data 152 may comprise pose data 154, that is indicative of a location and orientation within the physical space 106. In other examples, localization data 152 may indicate a location without an orientation. Pose data 154 may comprise pose data 120, 122, 124, 510, 512, 610, 612, 710, and 712, among other pose data.

The AMD 104 may be configured to dock or connect to a dock 102(1). The dock 102(1) may provide external power which the AMD 104 may use to charge a battery 144 of the AMD 104.

The AMD 104 may include battery(s) 144 to provide electrical power for operation of the AMD 104. The battery 144 may be rechargeable, allowing it to store electrical energy obtained from an external source. In other implementations, a wireless power receiver may be used to provide power for operation of the AMD 104, recharge the battery 144, and so forth.

One or more motors 142 or other actuators enable the AMD 104 to move from one location in the physical space 106 to another. For example, a motor 142 may be used to drive a wheel attached to a chassis of the AMD 104, which causes the AMD 104 to move. The AMD 104 may turn, move forward, move backward, and so forth. In another example, actuators may move mechanical legs allowing the AMD 104 to walk.

The AMD 104 may include one or more hardware processors 140 (processors) configured to execute one or more stored instructions. The processors 140 may comprise one or more cores. The processors 140 may include microcontrollers, systems on a chip, field programmable gate arrays, digital signal processors, graphic processing units, general processing units, and so forth.

The AMD 104 includes one or more memories 146. The memory 146 may comprise one or more non-transitory computer-readable storage media (CRSM).

The AMD 104 may include one or more sensors 160. For example, the sensors 160 may include microphones, time-of-flight (TOF) sensors, cameras, LIDAR, inductive sensors, and so forth. The sensors 160 may generate sensor data 148 and the inductive sensors may generate signal data indicative of measured signal strength. The sensors 160 are discussed in more detail with regard to FIG. 3.

An autonomous navigation module 164 provides the AMD 104 with the ability to navigate within the physical space 106 without real-time human interaction. The autonomous navigation module 164 may implement, or operate in conjunction with, a mapping module to determine one or more of an occupancy map 150, a navigation map, or other representations of the physical space 106. The AMD 104 may move through the physical space 106. The motion of the AMD 104 may be described as a trajectory. In some implementations the trajectory may include a series of poses. Each pose may be indicative of a particular location with respect to a plurality of orthogonal axes and rotation with respect to individual ones of the axes. For example, the pose may comprise six-dimensional (6D) information indicative of coordinates in three-dimensional space with respect to a designated origin, and rotation with respect to each of the three axes. The autonomous navigation module 164 is discussed in more detail with regard to FIG. 2.

The AMD 104 may use network interfaces to connect to a network 182. For example, the network 182 may comprise a wireless local area network, that in turn is connected to a wide area network such as the Internet.

The dock 102(1) may also be connected to the network 182. For example, the dock 102(1) may be configured to connect to the wireless local area network 182 such that the dock 102(1) and the AMD 104 may communicate.

The AMD 104 may access one or more servers 184 via the network 182. For example, the AMD 104 may utilize a wakeword detection module to determine if the user is addressing a request to the AMD 104. The wakeword detection module may hear a specified word or phrase and transition the AMD 104 or portion thereof to the wake operating mode. Once in the wake operating mode, the AMD 104 may then transfer at least a portion of the audio spoken by the user to one or more servers 184 for further processing. The servers 184 may process the spoken audio and return to the AMD 104 data that may be subsequently used to operate the AMD 104.

The AMD 104 may also communicate with other devices 186. The other devices 186 may include one or more devices that are within the physical space 106 such as a home or associated with operation of one or more devices in the physical space 106. For example, the other devices 186 may include a doorbell camera, a garage door opener, a refrigerator, washing machine, and so forth. In some implementations the other devices 186 may include other AMDs 104, vehicles, and so forth.

Figure 2:
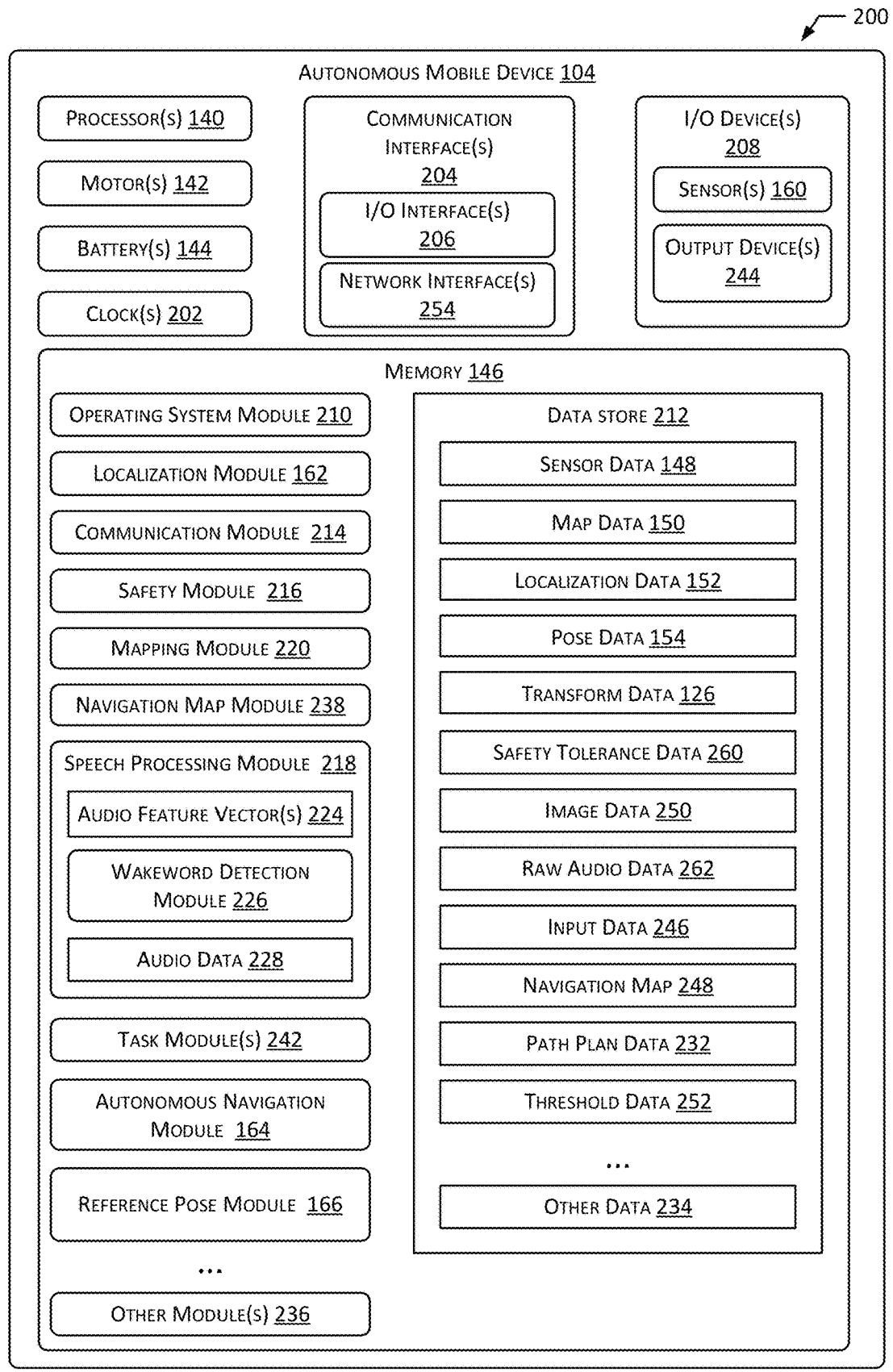
FIG. 2 is a block diagram of the components of the AMD, according to some implementations.

FIG. 2 is a block diagram 200 of the components of the AMD 104, according to some implementations.

The AMD 104 may include one or more batteries 144 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

The AMD 104 may include one or more network interfaces 254. The network interfaces 254 may include devices to connect to personal area networks (PANs), local area networks (LANs), wireless local area networks (WLANS), wide area networks (WANs), and so forth. For example, the network interfaces 254 may include devices compatible with Ethernet, Wi-Fi, Bluetooth, Bluetooth Low Energy, ZigBee, and so forth.

During operation, the AMD 104 may determine input data 246. The input data 246 may include or be based at least in part on sensor data 148 from the sensors 160 onboard the AMD 104. In one implementation, a speech processing module 218 may process raw audio data 262 obtained by a microphone on the AMD 104 and produce input data 246. For example, a user may say "robot, come here" which may produce input data 246 "come here". In another implementation, the input data 246 may comprise information such as a command provided by another computing device, such as a smartphone or tablet computer.

A mapping module 220 determines a representation of the physical space 106 that includes obstacles and their locations in the physical space 106. During operation, the mapping module 220 uses the sensor data 148 from various sensors 160 to determine information such as where the AMD 104 is, how far the AMD 104 has moved, the presence of obstacles, where those obstacles are, and so forth.

The mapping module 220 uses a simultaneous localization and mapping (SLAM) module. Localization is determining where the AMD 104 is in the physical space 106 and may utilize some external reference. For example, cameras may determine images. These images are processed to determine the presence of features in the images, such as edges of doors, shadows on the wall, texture on the walls, and so forth.

A descriptor is information that describes a particular feature or set of features. Various techniques such as a scale-invariant feature transform (SIFT), speeded up robust features (SURF), a trained convolutional neural network, and so forth may be used to characterize the features and generate the descriptors. For example, the descriptor may comprise data indicative of the feature with respect to 256 different dimensions.

While the AMD 104 is moving, the SLAM module may provide as output a series of poses, each pose describing a location and rotations in the physical space 106. Each pose is based at least in part on the apparent motion of observed features in the images. For example, from image to image at least some of the features that are described by descriptors will be in common. By determining the relative difference in apparent position in the image of the same feature as observed by two different cameras at the same time, the location of the camera with respect to the feature in the physical space 106 may be determined. At successive times, and as the AMD 104 moves and additional images are determined from locations in the physical space 106, the apparent change in position of the same feature across the additional images may be used to determine subsequent poses. In some implementations, an orientation may comprise information about six dimensions (6D), that of three orthogonal axes and corresponding rotations about those axes.

The SLAM module may also use data from other sensors 160 such as motor encoders, inertial measurement units (IMU) with one or more accelerometers and gyroscopes, and so forth. An IMU may comprise a tilt sensor. For example, inertial data indicative of rotations, accelerations along particular axes, and so forth obtained from the IMU may be integrated to provide information about the movement of the AMD 104.

A set of poses generated by the SLAM module over time may describe a given AMD 104 trajectory. For example, trajectory data may comprise a time series of pose data from the SLAM module.

While the AMD 104 is operating, the sensors 160 may be used to determine sensor data 148 comprising information about the physical space 106. In addition to cameras, the AMD 104 may include depth sensors that may determine depth data about the presence or absence of obstacles in the physical space 106, and so forth. For example, the sensors 160 may comprise a time-of-flight (TOF) depth camera, ultrasound, radar, and so forth. The depth data is indicative of whether an obstacle is detected or not and includes information about the distance between the sensor 160 and the obstacle and the relative direction with respect to the sensor 160 of an obstacle, if detected.

The sensor data 148 may be processed to determine occupancy data. The occupancy data is indicative of a particular area in the physical space 106, relative to the pose of the AMD 104 at the time the sensor data 148 was determined, and whether that area contains an obstacle or is determined to be free from obstacles.

The occupancy map 150 may be manually or automatically determined as part of an exploration process. This exploration may include an explicit exploration in which the AMD 104 moves through the physical space 106 or may be incidental exploration to movement of the AMD 104. For example, explicit exploration may involve the AMD 104 starting with no occupancy map 150 and moving throughout the physical space 106 to determine occupancy data and the corresponding occupancy map 150. In another example, incidental exploration may involve the AMD 104 following the user. Continuing the example, during a learning phase the user may take the AMD 104 on a tour of the physical space 106, allowing the mapping module 220 of the AMD 104 to determine occupancy data and the corresponding occupancy map 150. The user may provide input data 246 such as tags or other semantic data that designates a particular obstacle type, such as "furniture" or "fragile". In another example, during subsequent operation, the AMD 104 may generate the occupancy map 150 that is indicative of locations and types of obstacles such as chairs, doors, stairwells, and so forth as it moves unattended through the physical space 106.

Modules described herein, such as the mapping module 220, may provide various processing functions such as de-noising, filtering, and so forth. Processing of sensor data 148, such as image data 250 from a camera, may be performed by a module implementing, at least in part, one or more of the following tools or techniques. In one implementation, processing of image data 250 may be performed, at least in part, using one or more tools available in the OpenCV library as developed by Intel Corporation of Santa Clara, California, USA; Willow Garage of Menlo Park, California, USA; and Itseez of Nizhny Novgorod, Russia. In another implementation, functions available in the OKAO machine vision library as promulgated by Omron Corporation of Kyoto, Japan, may be used to process the sensor data 148. In still another implementation, functions such as those in the Machine Vision Toolbox (MVTB) available using MATLAB as developed by MathWorks, Inc. of Natick, Massachusetts, USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 148 or other data. For example, the ANN may be trained using a supervised learning algorithm such that object identifiers are associated with images of particular objects within training images provided to the ANN. Once trained, the ANN may be provided with the sensor data 148 and produce output indicative of the object identifier.

A navigation map module 238 uses the occupancy map 150 as input to generate a navigation map 248. For example, the navigation map module 238 may produce the navigation map 248 by inflating or enlarging the apparent size of obstacles as indicated by the occupancy map 150.

The AMD 104 autonomous navigation module 164 may generate path plan data 232 that is indicative of a path through the physical space 106 from the current location to a destination location. The AMD 104 may then begin moving along the path.

While moving along the path, the AMD 104 may assess the physical space 106 and update or change the path as appropriate. For example, if an obstacle appears in the path, the mapping module 220 may determine the presence of the obstacle as represented in the occupancy map 150 and navigation map 248. The now updated navigation map 248 may then be used to plan an alternative path to the destination location.

The AMD 104 may utilize one or more task modules 242. The task module 242 comprises instructions that, when executed, provide one or more functions. The task modules 242 may perform functions such as finding a user, following a user, presenting output on output devices 244 of the AMD 104, performing sentry tasks by moving the AMD 104 through the physical space 106 to determine the presence of unauthorized people, and so forth.

The AMD 104 includes one or more output devices 244, such as one or more of a motor 142, light, speaker, display, projector, printer, and so forth. The one or more output devices 244 may be used to provide output during operation of the AMD 104. The output devices 244 are discussed in more detail with regard to FIG. 3.

In other implementations, other types of autonomous mobile devices (AMDs) may use the systems and techniques described herein. For example, the AMD 104 may comprise an autonomous ground vehicle that is moving on a street, an autonomous aerial vehicle in the air, autonomous marine vehicle, and so forth.

One or more clocks 202 may provide information indicative of date, time, ticks, and so forth. For example, the processor 140 may use data from the clock 202 to associate a particular time with an action, sensor data 148, and so forth.

The AMD 104 may include one or more hardware processors 140 (processors) configured to execute one or more stored instructions. The processors 140 may comprise one or more cores. The processors 140 may include microcontrollers, systems on a chip, field programmable gate arrays, digital signal processors, graphic processing units, general processing units, and so forth.

The AMD 104 may include one or more communication interfaces 204 such as input/output (I/O) interfaces 206, network interfaces 254, and so forth. The communication interfaces 204 enable the AMD 104, or components thereof, to communicate with other devices 186 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 208. The I/O devices 208 may include input devices such as one or more of a sensor 160, keyboard, mouse, scanner, and so forth. The I/O devices 208 may also include output devices 244 such as one or more of a motor 142, light, speaker, display, projector, printer, and so forth. In some embodiments, the I/O devices 208 may be physically incorporated with the AMD 104 or may be externally placed.

The network interfaces 254 may be configured to provide communications between the AMD 104 and other devices 186 such as other AMDs 104, the dock 102(1), routers, access points, and so forth. The network interfaces 254 may include devices configured to couple to personal area networks (PANs), local area networks (LANs), wireless local area networks (WLANS), wide area networks (WANs), and so forth. For example, the network interfaces 254 may include devices compatible with Ethernet, Wi-Fi, Bluetooth, Bluetooth Low Energy, ZigBee, and so forth. The AMD 104 may also include one or more buses or other internal communications hardware or software that allow for the transfer of data between the various modules and components of the AMD 104.

As shown in FIG. 2, the AMD 104 includes one or more memories 146. The memory 146 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 146 provides storage of computer-readable instructions, data structures, program modules, and other data for the operation of the AMD 104. A few example functional modules are shown stored in the memory 146, although the same functionality may alternatively be implemented in hardware, firmware, or as a system on a chip (SoC).

The memory 146 may include at least one operating system (OS) module 210. The OS module 210 is configured to manage hardware resource devices such as the I/O interfaces 206, the I/O devices 208, the communication interfaces 204, and provide various services to applications or modules executing on the processors 140. The OS module 210 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; the Robot Operating System (ROS), and so forth.

Also stored in the memory 146 may be a data store 212 and one or more of the following modules. These modules may be executed as foreground applications, background tasks, daemons, and so forth. The data store 212 may use a flat file, database, linked list, tree, executable code, script, or other data structure to store information. In some implementations, the data store 212 or a portion of the data store 212 may be distributed across one or more other devices 186 including other AMDs 104, servers 184, network attached storage devices, and so forth.

A communication module 214 may be configured to establish communication with other devices 186, such as other AMDs 104, an external server 184, a dock 102(1), and so forth. The communications may be authenticated, encrypted, and so forth.

Other modules within the memory 146 may include a safety module 216, the mapping module 220, the navigation map module 238, the autonomous navigation module 164, the one or more task modules 242, a speech processing module 218, or other modules 236. The modules may access data stored within the data store 212, including safety tolerance data 260, sensor data 148, other data 234, and so forth.

The safety module 216 may access the safety tolerance data 260 to determine within what tolerances the AMD 104 may operate safely within the physical space 106. For example, the safety module 216 may be configured to stop the AMD 104 from moving when an extensible mast of the AMD 104 is extended. In another example, the safety tolerance data 260 may specify a minimum sound threshold which, when exceeded, stops all movement of the AMD 104. Continuing this example, detection of sound such as a human yell would stop the AMD 104.

The safety module 216 may include the speed limit module. The safety tolerance data 260 may include one or more of the thresholds used by the speed limit module. In the event the speed limit module determines a stop state, movement of the AMD 104 may be stopped by one or more of inhibiting operations of one or more of the motors 142, issuing a command to stop motor operation, disconnecting power from one or more the motors 142, and so forth. The safety module 216 may be implemented as hardware, software, or a combination thereof.

The safety module 216 may control other factors, such as a maximum speed of the AMD 104 based on information obtained by the sensors 160, precision and accuracy of the sensor data 148, and so forth. For example, detection of an object by an optical sensor may include some error, such as when the distance to an object comprises a weighted average between the object and a background. As a result, the maximum speed permitted by the safety module 216 may be based on one or more factors such as the weight of the AMD 104, nature of the floor, distance to the object, and so forth. In the event that the maximum permissible speed differs from the maximum speed permitted by the safety module 216, the lesser speed may be utilized.

One or more inflation parameters may be used during operation. The inflation parameters provide information such as inflation distance, inflation adjustment values, and so forth. In some implementations, the inflation parameters may be based at least in part on the sensor FOV 110, sensor blind spot, physical dimensions of the AMD 104, and so forth.

The speech processing module 218 may be used to process utterances of the user. Microphones may determine audio in the presence of the AMD 104 and may send raw audio data 262 to an acoustic front end (AFE). The AFE may transform the raw audio data 262 (for example, a single-channel, 16-bit audio stream sampled at 16 kHz), determined by the microphone, into audio feature vectors 224 that may ultimately be used for processing by various components, such as a wakeword detection module 226, speech recognition engine, or other components. The AFE may reduce noise in the raw audio data 262. The AFE may also perform acoustic echo cancellation (AEC) or other operations to account for output audio data that may be sent to a speaker of the AMD 104 for output. For example, the AMD 104 may be playing music or other audio that is being received from a network 182 in the form of output audio data. To avoid the output audio interfering with the device's ability to detect and process input audio, the AFE or other component may perform echo cancellation to remove the output audio data from the input raw audio data 262, or other operations.

The AFE may divide the raw audio data 262 into frames representing time intervals for which the AFE determines a number of values (i.e., features) representing qualities of the raw audio data 262, along with a set of those values (i.e., a feature vector or audio feature vector 224) representing features/qualities of the raw audio data 262 within each frame. A frame may be a certain period of time, for example a sliding window of 25 ms of audio data 228 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 262, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 224 (or the raw audio data 262) may be input into a wakeword detection module 226 that is configured to detect keywords spoken in the audio. The wakeword detection module 226 may use various techniques to determine whether raw audio data 262 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 226 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 226 may compare audio data 228 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN or using RNN. Following on, posterior threshold tuning, or smoothing is applied for decision making. Other techniques for wakeword detection, such as those known in the art, may also be used.

Once the wakeword is detected, circuitry or applications of the local AMD 104 may "wake" and begin transmitting audio data 228 (which may include one or more of the raw audio data 262 or the audio feature vectors 224) to one or more server(s) 184 for speech processing. The audio data 228 corresponding to audio obtained by the microphone may be processed locally on one or more of the processors 140, sent to a server 184 for routing to a recipient device or may be sent to the server 184 for speech processing for interpretation of the included speech (either for purposes of enabling voice-communications and/or for purposes of executing a command in the speech). The audio data 228 may include data corresponding to the wakeword, or the portion of the audio data 228 corresponding to the wakeword may be removed by the AMD 104 before processing by the navigation map module 238, before to sending to the server 184, and so forth.

The speech processing module 218 may include or access an automated speech recognition (ASR) module. The ASR module may accept as input raw audio data 262, audio feature vectors 224, or other sensor data 148 and so forth and may produce as output the input data 246 comprising a text string or other data representation. The input data 246 comprising the text string or other data representation may be processed by the navigation map module 238 to determine the command to be executed. For example, the utterance of the command "robot, come here" may result in input data 246 comprising the text string "come here". The wakeword "robot" may be omitted from the input data 246.

The autonomous navigation module 164 provides the AMD 104 with the ability to navigate within the physical space 106 without real-time human interaction. The autonomous navigation module 164 may implement, or operate in conjunction with, the mapping module 220 to determine the occupancy map 150, the navigation map 248, or other representation of the physical space 106. In one implementation, the mapping module 220 may use one or more simultaneous localization and mapping ("SLAM") techniques. The SLAM algorithms may utilize one or more of maps, algorithms, beacons, or other techniques to navigate. The autonomous navigation module 164 may use the navigation map 248 to determine a set of possible paths along which the AMD 104 may move. One of these may be selected and used to determine path plan data 232 indicative of a path. For example, a possible path that is the shortest or has the fewest turns may be selected and used to determine the path. The path is then subsequently used to determine a set of commands that drive the motors 142 connected to the wheels. For example, the autonomous navigation module 164 may determine the current location within the physical space 106 and determine path plan data 232 that describes the path to a destination location.

The AMD 104 may use the autonomous navigation module 164 to navigate to a docking area that includes the dock 102(1). For example, if the AMD 104 determines to recharge one or more batteries 144, then the AMD 104 may use path plan data 232 to navigate to a destination location that is in front of the dock 102(1). The autonomous navigation module 164 may utilize various techniques during processing of sensor data 148. For example, image data 250 obtained from cameras on the AMD 104 may be processed to determine one or more of corners, edges, planes, and so forth. In some implementations, corners may be detected, and the coordinates of those corners may be used to produce point cloud data. This point cloud data may then be used for SLAM or other purposes associated with mapping, navigation, and so forth.

The AMD 104 may move responsive to a determination made by an onboard processor 140, in response to a command received from one or more communication interfaces 204, as determined from the sensor data 148, and so forth. For example, an external server 184 may send a command that is received using the network interface 254. This command may direct the AMD 104 to proceed to find a particular user, follow a particular user, and so forth. The AMD 104 may then process this command and use the autonomous navigation module 164 to determine the directions and distances associated with carrying out the command. For example, the command to "come here" may result in the task module 242 sending a command to the autonomous navigation module 164 to move the AMD 104 to a particular location near the user and orient the AMD 104 in a particular direction.

The AMD 104 may connect to the network 182 using one or more of the network interfaces 254. In some implementations, one or more of the modules or other functions described here may execute on the processors 140 of the AMD 104, on the server 184, or a combination thereof. For example, one or more servers 184 may provide various functions, such as ASR, natural language understanding (NLU), providing content such as audio or video to the AMD 104, and so forth.

The other modules 236 may provide other functionality, such as object recognition, speech synthesis, user identification, and so forth. The other modules 236 may comprise a speech synthesis module that is able to convert text data to human speech. For example, the speech synthesis module may be used by the AMD 104 to provide speech that a user is able to understand.

The data store 212 may store the other data 234 as well. For example, localization settings may indicate local preferences such as language, user identifier data may be stored that allows for identification of a particular user, and so forth. The data store 212 may also store values for various thresholds as threshold data 252.

Figure 3:
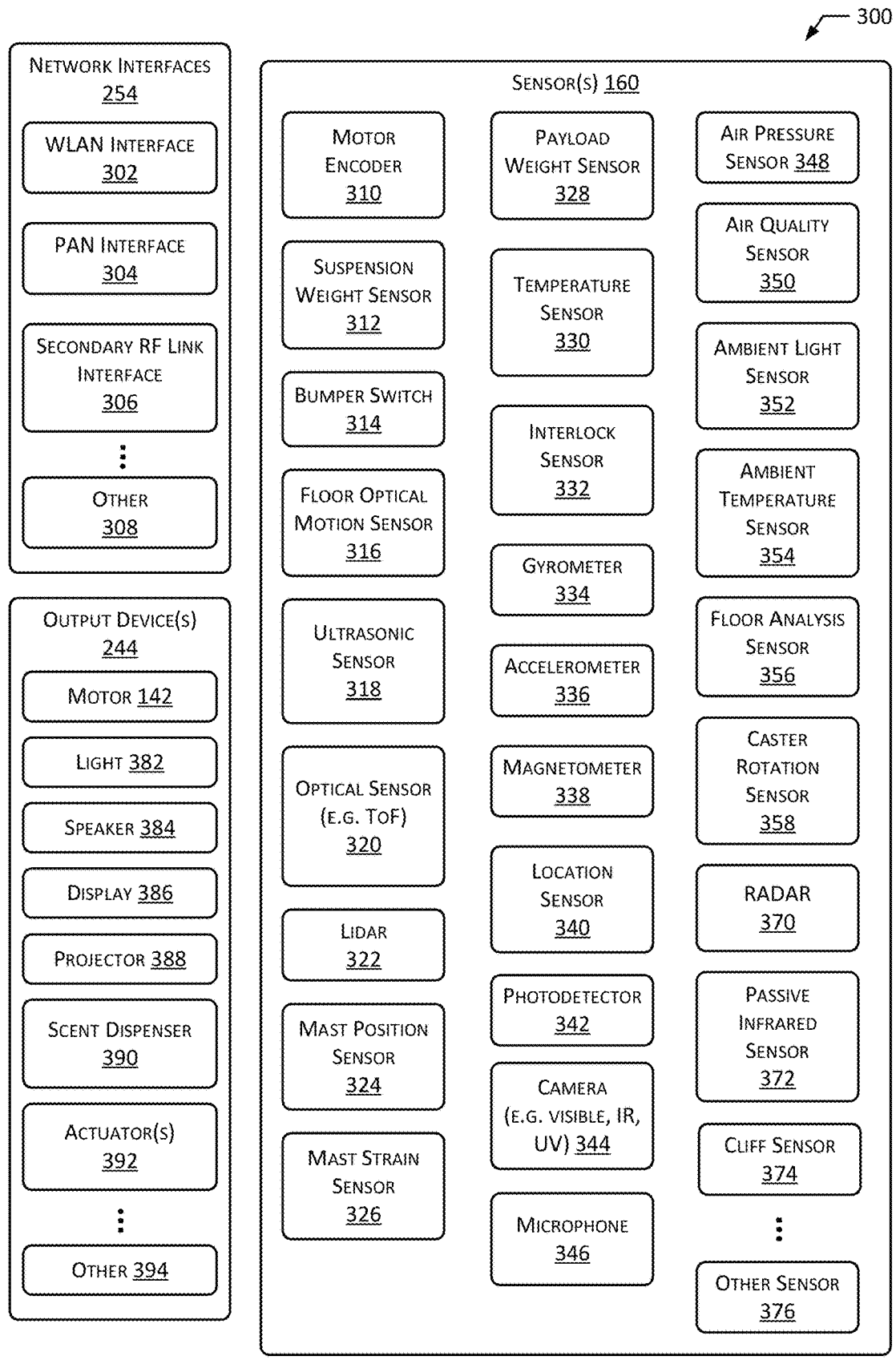
FIG. 3 is a block diagram of additional components of the AMD, according to some implementations.

FIG. 3 is a block diagram 300 of additional components of the AMD 104, according to some implementations.

The components illustrated here are provided by way of illustration and not necessarily as a limitation. For example, the AMD 104 may utilize a subset of the particular network interfaces 254, output devices 244, or sensors 160 depicted here, or may utilize components not pictured. One or more of the sensors 160, output devices 244, or a combination thereof may be included on a moveable component that may be panned, tilted, rotated, or any combination thereof with respect to a chassis of the AMD 104.

The network interfaces 254 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices 186 in the event that communication fails using one or more of the WLAN interface 302 or the PAN interface 304. For example, in the event the AMD 104 travels to an area within the physical space 106 that does not have Wi-Fi coverage, the AMD 104 may use the secondary RF link interface 306 to communicate with another device such as a specialized access point, dock 102(1), or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 4G, LTE, 5G, or other standards.

The AMD 104 may include one or more of the following sensors 160. The sensors 160 depicted here are provided by way of illustration and not necessarily as a limitation. It is understood that other sensors 160 may be included or utilized by the AMD 104, while some sensors 160 may be omitted in some configurations.

A motor encoder 310 provides information indicative of the rotation or linear extension of a motor 142. The motor 142 may comprise a rotary motor, or a linear actuator. In some implementations, the motor encoder 310 may comprise a separate assembly such as a photodiode and encoder wheel that is affixed to the motor 142. In other implementations, the motor encoder 310 may comprise circuitry configured to drive the motor 142. For example, the autonomous navigation module 164 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector 342, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 216 may use data from the suspension weight sensor 312 to determine whether or not to inhibit operation of one or more of the motors 142. For example, if the suspension weight sensor 312 indicates no weight on the suspension, the implication is that the AMD 104 is no longer resting on its wheels, and thus operation of the motors 142 may be inhibited. In another example, if the suspension weight sensor 312 indicates weight that exceeds a threshold value, the implication is that something heavy is resting on the AMD 104 and thus operation of the motors 142 may be inhibited. For example, the threshold value may comprise a weight of a load that compresses a suspension system to a minimum height, or results in a mass that exceeds a torque output of the motors 142 to maintain a minimum acceleration.

One or more bumper switches 314 provide an indication of physical contact between a bumper or other member that is in mechanical contact with the bumper switch 314. The safety module 216 utilizes sensor data 148 obtained by the bumper switches 314 to modify the operation of the AMD 104. For example, if the bumper switch 314 associated with a front of the AMD 104 is triggered, the safety module 216 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 160 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 148 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 100 FOV, allowing the sensor to have an overall FOV of 40°.

In another implementation, a structured light pattern may be provided by the optical emitter. A portion of the structured light pattern may then be detected on the object using a sensor 160 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 216 and the autonomous navigation module 164 may utilize the sensor data 148 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 148 may be generated that is indicative of the presence of objects and the relative positions, shapes, and so forth that are visible to the lidar 322. Data from the lidar 322 may be used by various modules. For example, the autonomous navigation module 164 may utilize point cloud data generated by the lidar 322 for localization of the AMD 104 within the physical space 106.

The AMD 104 may include a mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector 342 to determine the distance to which the mast is extended. In another implementation, the mast position sensor 324 may comprise an encoder wheel that is attached to a mast motor that is used to raise or lower the mast. The mast position sensor 324 may provide data to the safety module 216. For example, if the AMD 104 is preparing to move, data from the mast position sensor 324 may be checked to determine if the mast is retracted, and if not, the mast may be retracted before to beginning movement.

A mast strain sensor 326 provides information indicative of a strain on the mast with respect to the remainder of the AMD 104. For example, the mast strain sensor 326 may comprise a strain gauge or load cell that measures a sideload applied to the mast or a weight on the mast or downward pressure on the mast. The safety module 216 may utilize sensor data 148 obtained by the mast strain sensor 326. For example, if the strain applied to the mast exceeds a threshold amount, the safety module 216 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 216 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries 144, one or more motors 142, and so forth. In the event the temperature exceeds a threshold value, the component associated with that device temperature sensor 330 may be shut down. For example, the threshold value may be determined based on component specifications, such as a maximum permissible temperature of the batteries 144.

One or more interlock sensors 332 may provide data to the safety module 216 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

A gyroscope 334 may provide information indicative of rotation of an object affixed thereto. For example, a gyroscope 334 may generate sensor data 148 that is indicative of a change in orientation of the AMD 104 or a portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 148 indicative of impinging light. For example, the photodetector 342 may provide data indicative of a color, intensity, duration, and so forth.

A camera 344 generates sensor data 148 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use image data 250 determined by the camera 344 for object recognition, navigation, collision avoidance, user communication, and so forth. For example, a pair of cameras 344 sensitive to infrared light may be mounted on the front of the AMD 104 to provide binocular stereo vision, with the sensor data 148 comprising images being sent to the autonomous navigation module 164. In another example, the camera 344 may comprise a 10 megapixel or greater camera that is used for videoconferencing or for acquiring pictures for the user.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 164 may be determined using a rolling shutter and subsequently may be processed to mitigate image artifacts.

One or more microphones 346 may be configured to determine information indicative of sound present in the physical space 106. In some implementations, arrays of microphones 346 may be used. These arrays may implement beamforming techniques to provide for directionality of gain. The AMD 104 may use the one or more microphones 346 to determine information from acoustic tags, accept voice input from users, determine a direction of an utterance, determine ambient noise levels, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, or duration of ambient lighting around the AMD 104.

An ambient temperature sensor 354 provides information indicative of the temperature of the ambient physical space 106 proximate to the AMD 104. In some implementations, an infrared temperature sensor may be utilized to determine the temperature of another object at a distance.

A floor analysis sensor 356 may include one or more components that are used to generate at least a portion of floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 216, the autonomous navigation module 164, the task module 242, and so forth. For example, if the floor analysis sensor 356 determines that the floor is wet, the safety module 216 may decrease the speed of the AMD 104 and generate a notification alerting the user.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 490 at a second time.

The sensors 160 may include a radar 370. The radar 370 may be used to provide information as to a distance, lateral position, and so forth, to an object.

The sensors 160 may include a passive infrared (PIR) sensor 372. The PIR 372 sensor may be used to detect the presence of users, pets, hotspots, and so forth. For example, the PIR sensor 372 may be configured to detect infrared radiation with wavelengths between 8 and 14 micrometers.

A cliff sensor 374 may comprise an optical sensor 320. The AMD 104 may have one or more cliff sensors 374 located on a front portion of the AMD 104. For example, the cliff sensors 374 may be time-of-flight sensors that have a field of view directed downward toward a floor over which the AMD 104 is moving towards.

The AMD 104 may include other sensors 376 as well. For example, a capacitive proximity sensor may be used to provide proximity data to adjacent objects. Other sensors 376 may include radio frequency identification (RFID) readers, near field communication (NFC) systems, coded aperture cameras, and so forth. For example, NFC tags may be placed at various points within the physical space 106 to provide landmarks for the autonomous navigation module 164. One or more touch sensors may be utilized to determine contact with a user or other objects.

The AMD 104 may include one or more output devices 244. A motor 142 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user. Continuing the example, a motor 142 with an eccentric weight may be used to create a buzz or vibration to allow the AMD 104 to simulate the purr of a cat.

Figure 4:
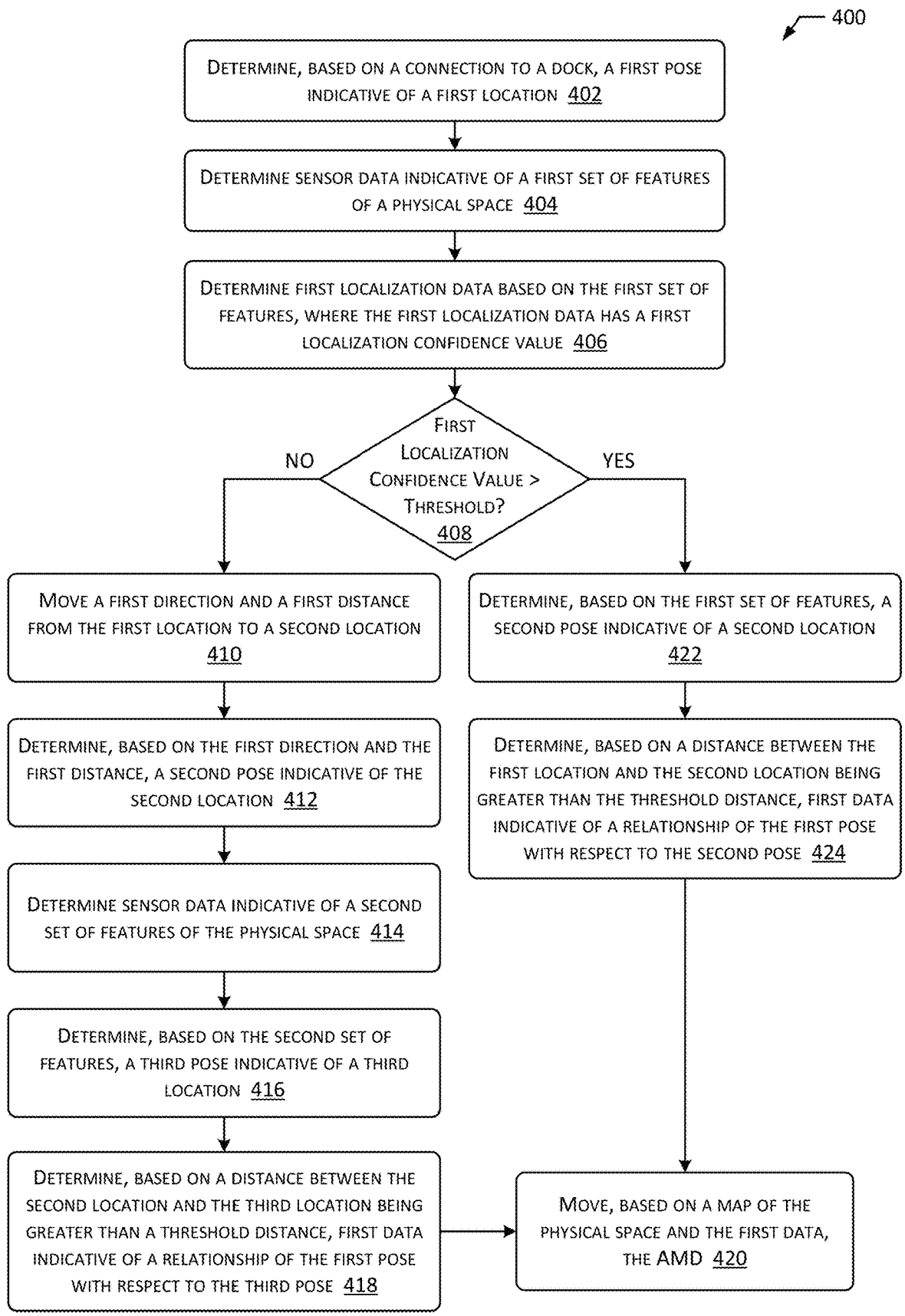
FIG. 4 illustrates a flow diagram for determining transform data, according to some implementations.

FIG. 4 illustrates a flow diagram 400 for determining transform data 126, according to some implementations.

In this example, the AMD 104 may be docked and within a physical space 106. The AMD 104 may have already determined an occupancy map 150 and a feature map relative to a dock pose that matches a reference pose. In the following description, the reference pose module 166 may determine that the dock 102(1) has been moved based on a variance between pose data relative to a dock pose and an AMD pose based on reliably localizing using the SLAM module. As discussed with respect to FIG. 1, the AMD 104 may be deemed to reliably localize if localization data has an associated localization confidence value that is greater than a confidence threshold. Localization confidence values may be based on a number of features determined by the AMD 104 while at a given pose, statistical analysis of the data processed by the SLAM module, and so forth as discussed with respect to FIG. 1.

In some examples, the variance exceeds a variance threshold based on one or more variances between respective coordinate values between a first pose and a second pose being greater than a respective threshold. In some examples, pose data relative to a dock 102(1) may include inaccuracy in distance or direction traveled due to a mismatch between motor encoder data instructing the AMD 104 to travel a particular distance and direction and a distance and direction traveled by the AMD 104. In some examples, such a mismatch may be due to one or more of: wheel slippage, uneven surfaces, changes in floor surface, damage to the AMD 104, and so forth. In some examples, the variance threshold may account for some inaccuracy in pose data that is relative to a dock pose. For example, the variance may exceed the variance threshold based on one or more of: a first difference between a first X-coordinate and a second X-coordinate being greater than a first coordinate threshold, a second difference between a first Y-coordinate and a second Y-coordinate being greater than a second coordinate threshold, a third difference between a first Z-coordinate and a second Z-coordinate being greater than a third coordinate threshold, or a fourth difference between a first theta-coordinate and a second theta-coordinate being greater than a fourth coordinate threshold. The first coordinates may be coordinates indicated by the first pose and the second coordinates may be indicated by the second pose. The first pose may be a pose relative to the dock pose and the second pose may be the reference pose.

At 402, the AMD 104 may determine, based on a connection to the dock 102(1), a first pose indicative of a first location. If the AMD 104 is docked, then the AMD 104 may determine that the AMD 104 is at the reference pose and determine the first pose to be equal to the reference pose. For example, determining the first pose may comprise retrieving from memory first data that is indicative of the first pose. The first pose may be a most recently determined pose stored within memory 146. As another example, the AMD 104 may determine the first pose to be (0, 0, 0, 0°) based on the connection to the dock 102(1). The first pose may indicate a first location and a first orientation. In the event that the AMD 104 is not at the reference pose, after reliably localizing, the AMD 104 may determine a variance between the first pose and a pose based on reliably localizing using the SLAM module. As discussed with respect to FIG. 1, the AMD 104 may reliably localize if a localization confidence value is greater than a confidence threshold. Localization confidence values may be based on a number of features determined by the AMD 104 while at a given pose, as discussed with respect to FIG. 1. Based on the variance, the AMD 104 may determine that the dock 102(1) has been moved. A variance between poses may be indicated by a mismatch or inequality between one or more of the: X-coordinate, Y-coordinate, Z-coordinate, or orientation coordinate.

In some implementations, the AMD 104 may determine whether the dock 102(1) has moved based on a length of time of a localization failure. As described in earlier examples, the AMD 104 may be localizing periodically or in response to acquired sensor data 148, where localizing includes determining localization data associated with a localization confidence value. A localization failure may a period of time during which a localization confidence value is below the confidence threshold. The confidence threshold may be associated with localization data that is accurate enough for safe and reliable navigation through the physical space 106.

For example, if the AMD 104 is lifted, then while the AMD 104 is being lifted, the AMD 104 may be unable to determine sensor data 148 that reliably determines a pose with respect to the reference pose. Similarly, a localization failure may be based on one or more of: a reboot of the AMD 104, placement of the AMD 104 into a privacy mode with limited sensor availability, loss of power, or a failure of one or more sensors 160. A localization failure may also be based on determining that a distance between successive locations indicated by successively determined localization data exceeds a distance threshold. The distance threshold may be a distance that may be traversed by the AMD 104 at a maximum speed during the time elapsed between the successive determinations of localization data.

Continuing with this example, if the length of time of a localization failure is short, then the AMD 104 may determine a likelihood that the dock 102(1) has moved. If the length of time of a localization failure is longer, then the AMD 104 may determine that the dock pose is less reliable. For example, if at a first time, the AMD 104 is rebooted, and the reboot takes less than five seconds, then the AMD 104 may determine that the dock 102(1) has not moved. More generally, the AMD 104 may determine a likelihood that the dock 102(1) has moved based on an amount of time of a localization failure being greater than a threshold length of time. For example, if the amount of time of a localization failure is less than or equal to the threshold length of time, then the AMD 104 may determine that a likelihood that the dock 102(1) has moved is low. If the amount of time of the localization failure is greater than the threshold length of time, then the AMD 104 may determine that the likelihood that the dock 102(1) has moved is high.

In some implementations, the likelihood of the dock 102(1) having moved may be used to determine when to merge data determined during exploration of the physical space 106. For example, the AMD 104 may use SLAM to update a map as the AMD 104 explores. The map may be an occupancy map 150, a feature map, or both an occupancy map 150 and feature map. For example, if the AMD 104 determines sensor data 148 that is indicative of an object 108, the AMD 104 may determine one or more features of the object 108 and update a map to indicate one or more of: location, size, or one or more features of the object 108.

Continuing with this example, if the likelihood of the dock 102(1) having moved is low, then the AMD 104 may use SLAM to update the map in response to determining sensor data 148. If the likelihood of the dock 102(1) having moved is high, then the AMD 104 may store the SLAM data without updating the map until the AMD 104 reliably localizes with a localization confidence value that is greater than the confidence threshold. In response to reliably localizing with a localization confidence value that is greater than the confidence threshold, the AMD 104 may merge the SLAM data with the map. Merging the SLAM data with the map may comprise one or more of: adding new features, modifying existing features, adding new objects or obstacles, modifying a location of an object or obstacle, removing features, or removing objects or obstacles.

At 404, the AMD 104 may determine sensor data 148 indicative of a first set of features of the physical space 106. In this example, the AMD 104 is unable to reliably localize while docked. Because the AMD 104 is unable to reliably localize while docked, the AMD 104 leaves the dock 102(1) and moves about the physical space 106. As the AMD 104 is moving, the AMD 104 determines first pose data indicative of one or more poses that are based on the first pose. In this example, at some point after the AMD 104 has left the dock 102(1), the AMD 104 may determine sensor data 148 indicative of one or more of depth data, acoustic data, or image data 250. The sensor data 148 may be determined by one or more sensors 160 having an aggregate field-of-view 110. Based on the sensor data 148, the AMD 104 may determine the first set of features. The first set of features may include edges, distance, color, dimensions of some or all of the first set of objects within the field-of-view 110, and so forth.

At 406, the AMD 104 may determine first localization data 152 based on the first set of features, where the first localization data 152 has a first localization confidence value. The first localization data 152 may be based on a feature map. For example, the AMD 104 may be at a given location and a given orientation in the physical space 106. Based on the first set of features, the AMD 104 may determine a pose associated with the first set of features. The first set of features may be associated with the first localization confidence value. For example, with the AMD 104 at the given pose, a confidence associated with the given pose may be based on a number of features determined by the AMD 104 while at the given pose. For example, if over a threshold number of features are associated with a given pose, then a localization confidence value associated with the given pose may be greater than a confidence threshold. In this example, the threshold number may be one thousand features, but in other examples, the threshold number may be more or less than a thousand features. The AMD 104 may then determine the first localization data 152 comprising a pose associated with the first set of features. In this example, second pose data may indicate the pose based on the SLAM module localizing with a localization confidence value that is greater than a confidence threshold.

At 408, the reference pose module 166 may determine whether the first localization confidence value is greater than a threshold value. If the first localization confidence value is greater than the threshold value, then the pose data based on the feature map is reliable and the AMD 104 may reliably localize based on the pose associated with the first set of features. If the AMD 104 is able to reliably localize while docked, then the AMD 104, without leaving the dock 102(1), may determine whether the dock 102(1) has moved. In this example, if the first localization confidence value is greater than the threshold value, then the AMD 104 is able to reliably localize while docked, and the process continues at 422. Otherwise, if the first localization confidence value is less than or equal to the threshold value, then the AMD 104 is unable to reliably localize while docked, and the process continues at 410.

At 410, the AMD 104 may move in a first direction and a first distance from the first location to a second location. For example, the AMD 104 may leave the dock 102(1) and begin to move about the physical space 106. As the AMD 104 moves, the AMD 104 determines first pose data relative to the dock 102(1). At 410, the AMD 104 has not yet determined that the dock 102(1) has moved and the AMD 104 has not yet reliably localized. Instead, at 412, the AMD 104 determines the first pose data to indicate one or more poses that are relative to the dock 102(1).

At 412, the AMD 104 may determine, based on the first direction and the first distance, a second pose indicative of the second location. For example, after moving the first direction and the first distance, the autonomous navigation module 164 may determine the second pose to indicate coordinates based on moving the first distance in the first direction from the dock 102(1). The first distance and the first direction may be determined using motor encoder data indicating an amount of rotation of each wheel from the first location.

At 414, the AMD 104 may determine sensor data 148 indicative of a second set of features of the physical space 106. For example, the one or more sensors 160 may determine sensor data 148 associated with field-of-view 110. For example, sensor data 148 may comprise images determined from one or more cameras 344. These images are used to determine one or more of the second set of features, such as edges of doors, shadows on the wall, texture on the walls, and so forth. Sensor data may also comprise depth data indicative of one or more objects within the FOV 110, such as furniture, walls, doorways, hallways, stairs, and so forth. The depth data may be used to determine one or more of the second set of features.

At 416, the AMD 104 may determine, based on the second set of features, a third pose indicative of a third location. For example, based on the second set of features, the AMD 104 may determine a pose associated with the second set of features. The second set of features may be associated with a second localization confidence value. In this example, the second localization confidence value is greater than the threshold value, and the pose associated with the second set of features is determined to be reliable. Based on the pose associated with the second set of features being determined to be reliable, the third pose may be determined to be the pose associated with the second set of features. In this example, the third pose may indicate a third location.

At 418, the AMD 104 may determine, based on a distance between the second location and the third location being greater than a threshold distance, first data indicative of a relationship of the first pose with respect to the third pose. For example, the second pose may indicate (X1, Y1, Z1, $\Theta_1$), and the third pose may indicate (X2, Y2, Z2, $\Theta_2$). If the dock 102(1) were located at the reference pose, then the second location and the third location would be the same or would be within a threshold distance from each other. The threshold distance may be determined based on an amount of error between distance traveled and motor encoder data instructing the AMD 104 to travel the particular distance. In this example, if the dock 102(1) were still located at the reference location, then X1 would be within the threshold distance of X2, Y1 would be within the threshold distance of Y2, and Z1 would be within the threshold distance of Z2.

However, in this example, because the dock 102(1) has been moved, the distance between the second location and the third location is greater than the threshold distance. Based on the distance between the second location and the third location being greater than the threshold distance, first data indicative of a relationship of the first pose with respect to the third pose may be determined as described with respect to FIG. 1. In this example, the first data may be determined to be indicative of transform data 126 that relates a current dock pose with the reference pose that was used to build a map of a physical space 106. The transform data 126 may transform first coordinates that are relative to the first pose into second coordinates that are relative to the reference pose. The transform data 126 may be an inverse of the X-Y-Z movement and rotation of the dock 102(1) relative to the reference pose. The difference between coordinates for the dock 102(1) and the reference pose may be determined using the difference between the first pose and the third pose, as described with respect to FIG. 1.

At 420, the AMD 104 may move based on a map of the physical space 106 and on the first data. For example, the autonomous navigation module 164 may continuing moving the AMD 104 through the physical space 106 using the dock 102(1) as a coordinate reference and using the first data indicative of the transform data 126 to convert coordinates using the dock as a coordinate reference into coordinates using the reference pose as a coordinate reference. As the AMD 104 moves, coordinates of objects and features determined by the AMD 104 are converted using the transform data 126 into coordinates relative to the reference pose.

Returning to 408, if the first localization confidence value is greater than the threshold value, the process continues to 422. At 422, the AMD 104 may determine, based on the first set of features, a second pose indicative of a second location. For example, based on the first set of features, the AMD 104 may determine a pose associated with the first set of features. The first set of features may be associated with a third localization confidence value. In this example, the third localization confidence value is greater than the threshold value, and the pose associated with the first set of features is determined to be reliable. Based on the pose associated with the first set of features being determined to be reliable, the second pose may be determined to be the pose associated with the first set of features. In this example, second pose may indicate a second location.

At 424, the AMD 104 may determine, based on a distance between the first location and the second location being greater than the threshold distance, first data indicative of a relationship of the first pose with respect to the second pose. For example, the first pose may indicate (X1, Y1, Z1, $\ominus_1$), and the second pose may indicate (X2, Y2, Z2, $\ominus_2$). If the dock 102(1) were located at the reference pose, then the first location and the second location would be the same or would be within a threshold distance from each other. The threshold distance may be determined based on an amount of error between the distance traveled and motor encoder data instructing the AMD 104 to travel the particular distance. In this example, because the dock 102(1) has been moved, the distance between the first location and the second location is greater than the threshold distance. As described with respect to step 418, the reference pose module 166 may determine first data to indicate the relationship of the first pose with respect to the second pose. Given the first data, the process may continue to step 420.

Figure 5:
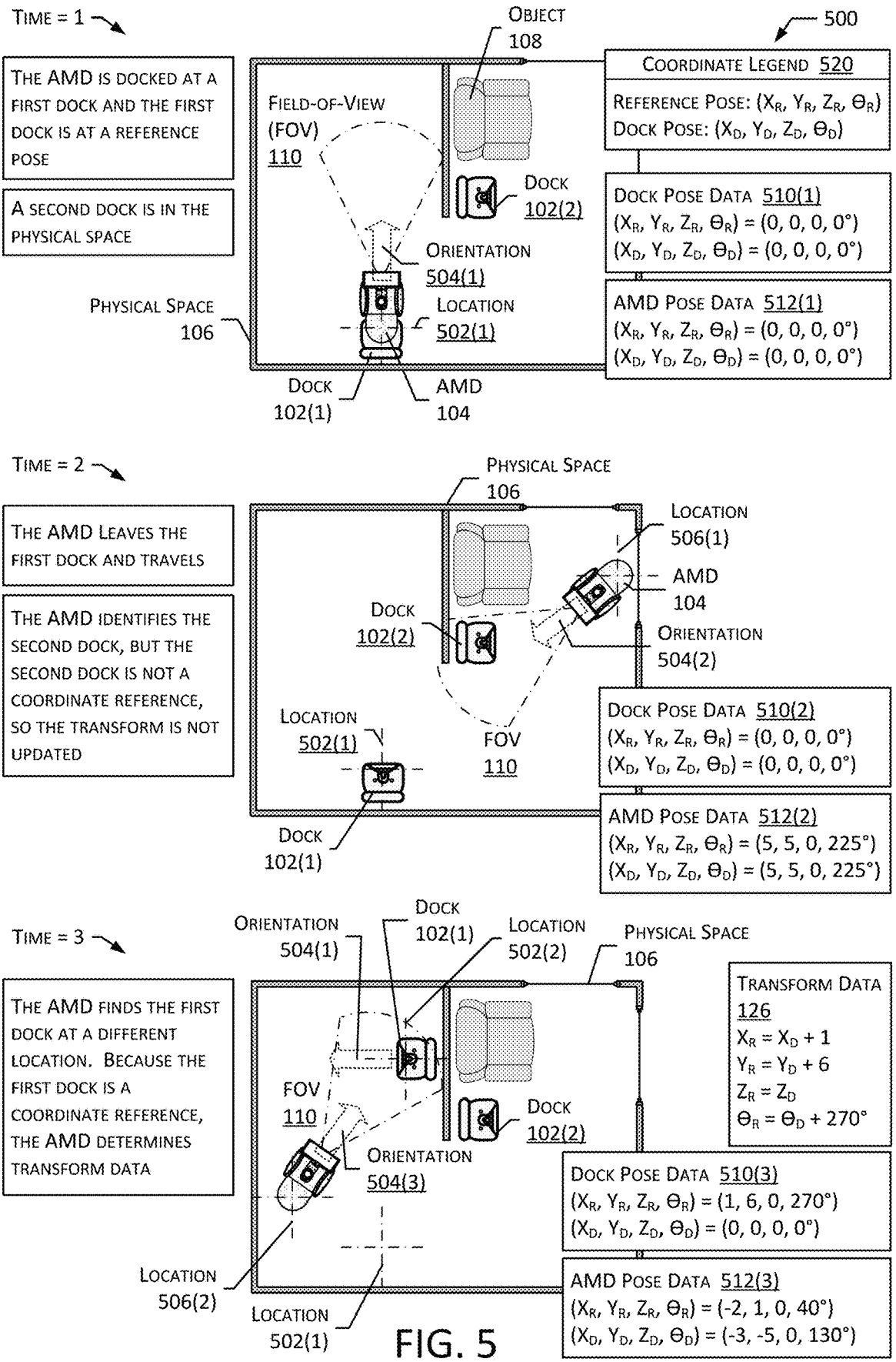
FIG. 5 illustrates opportunistic updating of a dock pose, according to some implementations.

FIG. 5 illustrates at 500 opportunistic updating of a dock pose, according to some implementations.

In this example, the AMD 104 may launch from a first dock 102(1) while the first dock 102(1) is at a pose that matches the reference pose. As the AMD 104 is traveling through a physical space 106, the first dock 102(1) may be moved and a second dock 102(2) may be encountered. At some point while the AMD 104 is traveling, the AMD 104 may encounter the first dock 102(1) at a pose that is different from the pose from which the AMD 104 launched. In this example, in response to determining that the first dock 102(1) has moved, the AMD 104 may determine transform data 126 that relates the first dock pose to the reference pose.

In the following example, there are two coordinate systems, a first coordinate system that is relative to the reference pose, and a second coordinate system that is relative to a dock pose. After the AMD 104 launches from the first dock 102(1), the AMD 104 may determine pose data relative to the first dock 102(1) until the AMD 104 reliably localizes. After the AMD 104 reliably localizes with respect to the reference pose, the AMD 104 then determines a pose of the first dock 102(1) relative to the reference pose. Based on the pose of the first dock 102(1) relative to the reference pose, the AMD 104 determines transform data 126 that specifies a relationship between coordinates in the second coordinate system and coordinates in the first coordinate system.

In some implementations, a physical space 106 may include multiple docks, where each dock is associated with an individual identifier. In this example, the physical space 106 includes the second dock 102(2). An individual identifier may be a marking, April tag, bar code, color, external design, or other visual indication of a value that is different from each other identifier for other docks. In this example, the first dock 102(1) may be associated with a first identifier, and the first dock 102(1) may be associated with an origin of a map of a physical space 106. In some examples, after the AMD 104 determines that the first dock 102(1) has moved, the AMD 104 determines transform data 126 based on determining that the first dock 102(1) is associated with the first identifier. Because the AMD 104 uses the first identifier to identify the first dock 102(1) before updating the transform data 126, if the AMD 104 detects other docks with other identifiers, the AMD 104 does not update the transform data 126. In the previous and following examples, the AMD 104 determines transform data 126 in response to determining that the first dock 102(1) has moved, and the AMD 104 determines the first dock 102(1) based on the first identifier.

At a first time, time=1 the AMD 104 is docked and the first dock 102(1) is at a reference pose. In this example, the AMD 104 is also at the reference pose. The dock pose data 510(1) indicates $(X_R, Y_R, Z_R, \theta_R)=(0, 0, 0, 0°)$ and $(X_D, Y_D, Z_D, \theta_D)=(0, 0, 0, 0°)$. As indicated by the coordinate legend 520, coordinates relative to the reference pose are indicated by $(X_R, Y_R, Z_R, \theta_R)$, and coordinates relative to the dock pose are indicated by $(X_D, Y_D, Z_D, \theta_D)$. The dock pose data 510(1) with respect to the reference pose indicates a first location 502(1) and a first orientation 504(1). A first pose is indicated by dock pose data 510(1). The dock pose data 510(1) indicates the first location 502(1) and the first orientation 504(1). Coordinates of the first pose may be (0, 0, 0, 0°). The AMD 104 may be at a second pose indicated by AMD pose data 512(1). Coordinates of the second pose may be (0, 0, 0, 0°).

At the first time, the second dock 102(2) is located next to a chair, depicted as object 108. In this example, the first dock 102(1) is associated with a first identifier and the second dock 102(2) is associated with a second identifier. The AMD 104 may store an association between the first dock 102(1) and the first identifier within memory 146. The first identifier may be indicated by a first April tag and the second identifier may be indicated by a second April tag. An April tag on a dock may be visible to one or more of the cameras 344 when the April tag is within a camera FOV.

At a second time, time=2, the AMD 104 has moved away from the first dock 102(1) and the AMD 104 is at a third pose indicated by AMD pose data 512(2). The AMD pose data 512(2) indicates a second location 506(1) and a second orientation 504(2). In this example, the third pose may have coordinates of (5, 5, 0, 225°). The third pose is relative to the first pose. At the second time, the first dock 102(1) has not moved and is at the first pose. At the second time, and at the third pose, at least a portion of the second dock 102(2) that comprises the second identifier may be within the AMD 104 FOV. The AMD 104 may determine image data using the one or more cameras 344. Based on the image data, the AMD 104 may determine the second identifier. Based on the second identifier being different than the first identifier, the AMD 104 determines that the second dock 102(2) is not the first dock 102(1). The AMD 104 may use the second dock 102(2) to dock, but because the second identifier does not match the first identifier, the AMD 104 does not determine transform data 126 relating the first dock 102(1) to the reference pose. In this example, the AMD 104 continues to move about the physical space 106.

At the third time, time=3, the AMD finds the first dock 102(1) at a different location than the first location 502(1) and determines transform data 126. In this example, the AMD 104 is at a fourth pose indicated by AMD pose data 512(3) and the first dock 102(1) is at a fifth pose indicated by dock pose data 510(3). At the third time, the AMD 104 determines sensor data 148 indicative of one or more objects within the FOV 110. Based on the sensor data 148, the AMD 104 determines that the sensor data 148 is indicative of the first dock 102(1). For example, the sensor data 148 may comprise image data indicative of the first identifier. Based on the first identifier matching the stored identifier associated with the first dock 102(1), the AMD 104 may determine that the dock indicated by the sensor data 148 is the first dock 102(1). The sensor data 148 may include depth data. Based on the depth data, the AMD 104 may determine the location 502(2) and orientation 504(1) of the first dock 102(1). For example, the AMD 104 may determine features of the first dock 102(1), including a first length, a first width, and a first height. The AMD 104 may determine that the first length, the first width, and the first height are indicative of the first dock 102(1). The AMD 104 may determine, based on the depth data indicative of the first dock 102(1), the fifth pose of the first dock 102(1).

Continuing this example, the AMD 104 may determine coordinates associated with the location 502(2). Because the first dock 102(1) has moved, the coordinates associated with the location 502(2) will be different from the first location 502(1) indicated by the first pose. For example, a variance between the coordinates associated with location 502(2) and the first location 502(1) may be greater than a variance threshold. Because the variance is greater than the variance threshold, the AMD 104 may determine transform data 126 indicative of a relationship of the fifth pose with respect to the first pose. In this example, the transform data 126 may relate a current dock pose, the first pose, with the reference pose.

The transform data 126 may associate first coordinates that are relative to the fifth pose into second coordinates that are relative to the reference pose. The X-Y-Z movement and rotation of the first dock 102(1) is the movement and rotation that occurred between the first time and the third time. The difference between coordinates relative to the first dock 102(1) and coordinates relative to the reference pose may be determined using the difference between the fifth pose and the reference pose, as described with respect to FIG. 1.

In this example, with respect to the first dock 102(1), to transform pose data relative to the first dock 102(1) into pose data relative to the reference pose, the transform data 126 is applied to the pose data relative to the first dock 102(1). In equation 2, the dock pose data 510(3) relative to the reference pose may be indicated by $(X_R, Y_R, Z_R, \theta_R) = (1, 6, 0, 270°)$, and the dock pose data 510(3) relative to the first dock 102(1) may be indicated by $(X_D, Y_D, Z_D, \theta_D) = (0, 0, 0, 0°)$. In this example, transform data 126 associates the pose relative to the first dock 102(1) into the pose relative to the reference pose and using the following equation:

$$(X_R, Y_R, Z_R, \theta_R) = (X_D + C_1, Y_D + C_2, Z_D + C_3, \theta_D + C_4). \quad \text{(Equation 2)}$$

In this example, at the third time, the first dock 102(1) has, relative to the reference pose, moved +1 m along the X-axis, moved +6 meters along the Y-axis, moved 0 meters along the Z-axis, and rotated 270°. Consequently, $C_1 = 1$, $C_2 = 6$, $C_3 = 0$, and $C_4 = 270°$.

In this example, with respect to the AMD 104, to transform AMD pose data 512 relative to the dock into AMD pose data 512(3) relative to the reference pose, the transform data 126 is applied to the AMD pose data 512(3) relative to the first dock 102(1). Using equation 2, the AMD pose data 512(3) relative to the reference pose may be indicated by $(X_R, Y_R, Z_R, \theta_R) = (-2, 1, 0, 40°)$, and the AMD pose data 512(3) relative to the dock pose may be indicated by $(X_D, Y_D, Z_D, \theta_D) = (-3, -5, 0, 130°)$.

Figure 6:
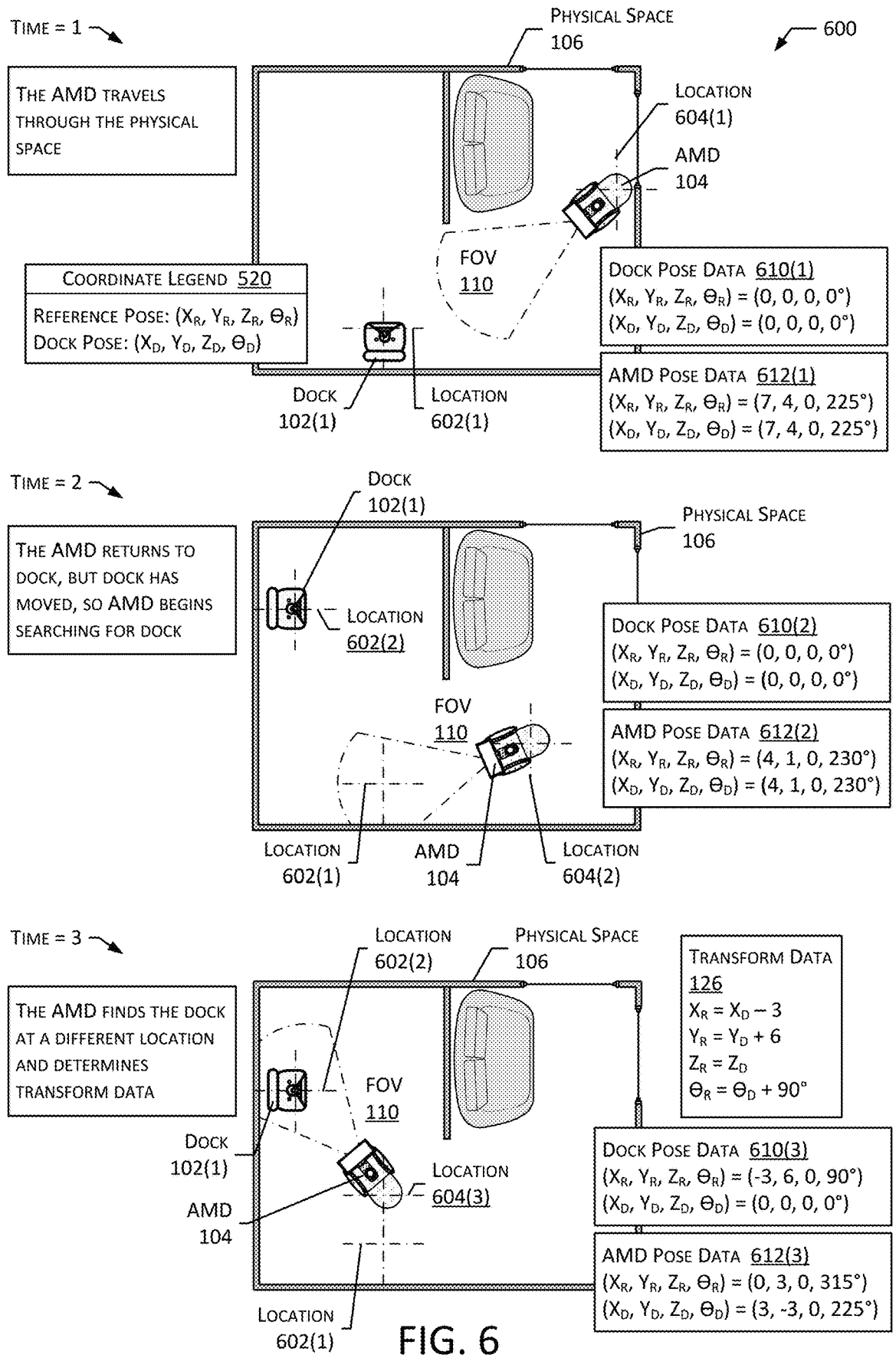
FIG. 6 illustrates a search in response to a relocated dock, according to some implementations.

FIG. 6 illustrates at 600, a search in response to a relocated dock, according to some implementations.

In this example, the AMD 104 may launch from the dock 102(1) while the dock 102(1) is at a pose that matches the reference pose. As the AMD 104 is traveling through a physical space 106, the dock 102(1) may be moved. At some point, the AMD 104 may return to the dock location 602(1) or a location proximate thereto and determine that the dock 102(1) has moved. In this example, in response to determining that the dock 102(1) has moved, the AMD 104 may search for the dock 102(1). When the AMD 104 finds the dock 102(1), the AMD 104 may determine transform data 126 that relates the dock pose at a current pose to the reference pose. In the following example, there are two coordinate systems, a first coordinate system that is relative to the reference pose, and a second coordinate system that is relative to a dock pose.

At a first time, time=1 the AMD 104 is docked and the dock 102(1) is at a reference pose. In this example, the AMD 104 is also at the reference pose. The dock pose data 610(1) indicates $(X_R, Y_R, Z_R, \theta_R) = (0, 0, 0, 0°)$ and $(X_D, Y_D, Z_D, \theta_D) = (0, 0, 0, 0°)$. As indicated by the coordinate legend 520, coordinates relative to the reference pose are indicated by $(X_R, Y_R, Z_R, \theta_R)$, and coordinates relative to the dock pose are indicated by $(X_D, Y_D, Z_D, \theta_D)$. The dock pose data 610(1) with respect to the reference pose indicates a first location 602(1) and a first orientation. A first pose is indicated by dock pose data 610(1). The dock pose data 610(1) indicates the first location 602(1) and the first orientation. Coordinates of the first pose may be (0, 0, 0, 0°). The AMD 104 may be at a second pose indicated by AMD pose data 612(1). Coordinates of the second pose relative to both the dock pose and the reference pose may be (7, 4, 0, 225°).

At a second time, time=2, the AMD 104 returns to the location 602(1) proximate to the dock 102(1) and determines that the dock 102(1) has moved. In response to determining that the dock 102(1) has moved, the AMD 104 may search for the dock 102(1). At the second time, the AMD 104 is at a third pose indicated by AMD pose data 612(2). In this example, relative to both the dock pose and the reference pose, the third pose may have coordinates of (4, 1, 0, 230°). The third pose is relative to the first pose. At the second time, the dock 102(1) has moved, but the AMD 104 has not yet determined a pose for the relocated dock 102(1) or determined transform data 126.

At the third time, time=3, the AMD 104 finds the dock 102(1) and determines transform data 126. In this example, the AMD 104 is at a fourth pose indicated by AMD pose data 612(3) and the dock 102(1) is at a fifth pose indicated by dock pose data 610(3). At the third time, the AMD 104 determines sensor data 148 indicative of one or more objects within the FOV 110. Based on the sensor data 148, the AMD 104 determines that the sensor data 148 is indicative of the dock 102(1). The sensor data 148 may include depth data. Based on the depth data, the AMD 104 may determine the location 602(2) and an orientation of the dock 102(1). For example, the AMD 104 may determine features of the dock 102(1), including a first length, a first width, and a first height. The AMD 104 may determine that the first length, the first width, and the first height are indicative of the dock 102(1). The AMD 104 may determine, based on the depth data indicative of the dock 102(1), the location 602(2) of the dock 102(1).

Continuing this example, the AMD 104 may determine coordinates associated with the location 602(2). Because the dock 102(1) has moved, the coordinates associated with the location 602(2) will be different from the first location 602(1) indicated by the first pose. For example, a variance between the coordinates associated with location 602(2) and the first location 602(1) may be greater than a variance threshold. Because the variance is greater than the variance threshold, the AMD 104 may determine transform data 126 indicative of a relationship of the fifth pose with respect to the first pose. In this example, the transform data 126 may relate a current dock pose, the first pose, with the reference pose.

The transform data 126 may transform first coordinates that are relative to the fifth pose into second coordinates that are relative to the reference pose. The X-Y-Z movement and rotation of the dock 102(1) is the movement and rotation that occurred between the first time and the third time. The difference between coordinates relative to the dock and coordinates relative to the reference pose may be determined using the difference between the fifth pose and the reference pose, as described with respect to FIG. 1.

In this example, with respect to the dock 102(1), to transform pose data relative to the dock into pose data relative to the reference pose, the transform data 126 is applied to the pose data relative to the dock. In equation 3, the dock pose data 610(3) relative to the reference pose may be indicated by $(X_R, Y_R, Z_R, \theta_R) = (-3, 6, 0, 90°)$, and the dock pose data 610(3) relative to the dock 102(1) may be indicated by $(X_D, Y_D, Z_D, \theta_D) = (0, 0, 0, 0°)$. In this example, the transform data 126 transforms the pose relative to the dock into a pose relative to the reference pose and using the following equation:

$$(X_R, Y_R, Z_R, \theta_R) = (X_D + C_1, Y_D + C_2, Z_D + C_3, \theta_D + C_4). \quad \text{(Equation 3)}$$

In this example, at the third time, the dock 102(1) has, relative to the reference pose, moved −3 m along the X-axis, moved +6 meters along the Y-axis, moved 0 meters along the Z-axis, and rotated 90°. Consequently, $C_1 = -3$, $C_2 = 6$, $C_3 = 0$, and $C_4 = 90°$.

In this example, with respect to the AMD 104, to transform AMD pose data 612(3) relative to the dock into AMD pose data 612(3) relative to the reference pose, the transform data 126 is applied to the AMD pose data 612(3) relative to the dock. Using equation 3, the AMD pose data 612(3) relative to the reference pose may be indicated by $(X_R, Y_R, Z_R, \theta_R) = (0, 3, 0, 315°)$, and the AMD pose data 612(3) relative to the dock pose may be indicated by $(X_D, Y_D, Z_D, \theta_D) = (3, -3, 0, 225°)$.

Figure 7:
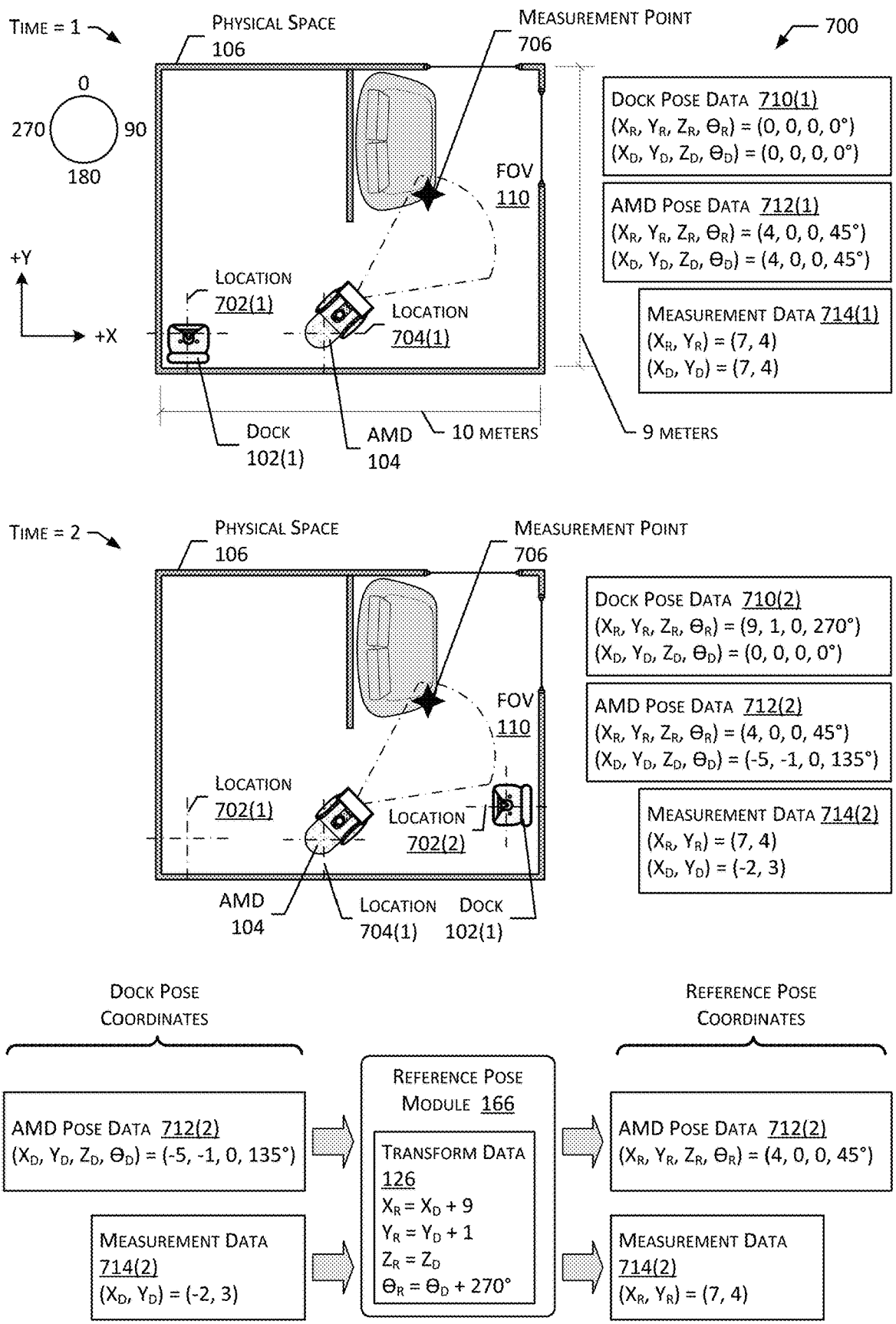
FIG. 7 illustrates transform data that relates a dock pose to a reference pose, according to some implementations.

FIG. 7 illustrates at 700, transform data 126 that relates a dock pose to a reference pose, according to some implementations.

In this example, the reference pose module 166 uses transform data 126 to relate coordinates relative to the dock pose into coordinates relative to the reference pose. At a first time, the AMD 104 may have launched from the dock 102(1) while the dock 102(1) is at a pose that matches the reference pose. As the AMD 104 is traveling through a physical space 106, the dock 102(1) may be moved. At some point while the AMD 104 is traveling, the AMD 104 may encounter the dock 102(1) in a pose that is different from the pose from which the AMD 104 launched. In this example, in response to determining that the dock 102(1) has moved, the AMD 104 may determine transform data 126 that relates the dock pose at a current location to the reference pose.

At a first time, time=1 the AMD 104 is traveling and the dock 102(1) is at a reference pose. The dock pose data 710(1) indicates $(X_R, Y_R, Z_R, \theta_R) = (0, 0, 0, 0°)$ and $(X_D, Y_D, Z_D, \theta_D) = (0, 0, 0, 0°)$. As indicated by coordinate legend 520 (shown in FIG. 5), coordinates relative to the reference pose are indicated by $(X_R, Y_R, Z_R, \theta_R)$, and coordinates relative to the dock pose are indicated by $(X_D, Y_D, Z_D, \theta_D)$. The dock pose data 710(1) with respect to the reference pose indicates a first location 702(1) and a first orientation. A first pose is indicated by dock pose data 710(1). The dock pose data 710(1) indicates the first location 702(1) and the first orientation. Coordinates of the first pose may be (0, 0, 0, 0°). The AMD 104 may be at a second pose indicated by AMD pose data 712(1). Coordinates of the second pose relative to both the dock pose and the reference pose may be (4, 0, 0, 45°). In this example, for simplicity, a single measurement point 706 is depicted. In other examples, sensor data may include depth data that indicates a point cloud with hundreds, or thousands, of distance measures to respective points of an object. Measurement point 706 is provided as an example of coordinates associated with an object. In this example, the coordinates associated with the object are used to indicate occupied areas of the physical space in an occupancy map. In this example, the coordinates and the occupancy map use the reference pose as an origin for a coordinate system. Measurement point 706 is associated with measurement data 714(1)-(2). At the first time, the measurement data 714(1) indicates measurement point 706 coordinates relative to the dock pose and the reference pose as (7, 4).

At a second time, time=2, the AMD 104 has reliably localized while traveling and has determined transform data 126. In this example, the AMD 104 continues to be at the second pose relative to the reference pose. The second pose is indicated by AMD pose data 712(2). The dock 102(1) is at a third pose indicated by dock pose data 710(2).

Continuing this example, the AMD 104 may determine coordinates associated with the location 702(2). Because the dock 102(1) has moved, the coordinates associated with the location 702(2) will be different from the first location 702(1) indicated by the first pose. For example, a variance between the coordinates associated with location 702(2) and the first location 702(1) may be greater than a variance threshold. Because the variance is greater than the variance threshold, the AMD 104 may determine transform data 126 indicative of a relationship of the third pose with respect to the first pose. In this example, the transform data 126 may relate a current dock pose, the first pose, with the reference pose.

The transform data 126 may transform first coordinates that are relative to the third pose into second coordinates that are relative to the reference pose. The X-Y-Z movement and rotation of the dock 102(1) is the movement and rotation that occurred between the first time and the second time. The difference between coordinates relative to the dock pose and coordinates relative to the reference pose may be determined using the difference between the third pose and the reference pose, as described with respect to FIG. 1.

In this example, with respect to the dock 102(1), to transform pose data relative to the dock 102(1) into pose data relative to the reference pose, the transform data 126 is applied to the pose data relative to the dock 102(1). In equation 4, the dock pose data 710(2) relative to the reference pose may be indicated by $(X_R, Y_R, Z_R, \theta_R)=(9, 1, 0, 270°)$, and the dock pose data 710(2) relative to the dock 102(1) may be indicated by $(X_D, Y_D, Z_D, \theta_D)=(0, 0, 0, 0°)$. In this example, the transform data 126 transforms the pose relative to the dock into a pose relative to the reference pose and using the following equation:

$$(X_R, Y_R, Z_R, \theta_R) = (X_D + C_1, Y_D + C_2, Z_D + C_3, \theta_D + C_4). \quad \text{(Equation 4)}$$

In this example, at the second time, the dock 102(1) has, relative to the reference pose, moved +9 m along the X-axis, moved +1 meter along the Y-axis, moved 0 meters along the Z-axis, and rotated 270°. Consequently, $C_1=9$, $C_2=1$, $C_3=0$, and $C_4=270°$.

In this example, with respect to the AMD 104, to transform AMD pose data relative to the dock into AMD pose data relative to the reference pose, the transform data 126 is applied to the AMD pose data relative to the dock. Using equation 4, the AMD pose data 712(2) relative to the reference pose may indicated by $(X_R, Y_R, Z_R, \theta_R)=(4, 0, 0, 45°)$, and the AMD pose data 712(2) relative to the dock pose is indicated by $(X_D, Y_D, Z_D, \theta_D)=(-5, -1, 0, 135°)$.

In this example, with respect to the measurement point 706, to transform the coordinates for the measurement point relative to the dock into coordinates relative to the reference pose, the transform data 126 is applied to the measurement data relative to the dock. Using equation 4, in this example, the measurement data relative to the dock is (−2, 3) and the transformed coordinates are (7, 4).

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An autonomous mobile device (AMD) comprising:
one or more sensors;
one or more memories storing computer-executable instructions; and
one or more processors to execute the computer-executable instructions to:
determine a map of a physical space relative to a first reference pose;
determine the AMD is connected to a dock, wherein the AMD and the dock are located in the physical space, and wherein the dock is associated with an origin of the map;
determine, based on the AMD being connected to the dock, that the AMD is in a first pose;
determine, using the one or more sensors, first sensor data indicative of a first set of features of the physical space;
determine, based on the first set of features, a second pose relative to the origin of the map;
determine a variance between the first pose and the second pose;
determine that the variance exceeds a variance threshold;
based on the variance exceeding the variance threshold, determine that the dock has moved;
determine, based on the dock having moved, first data that is indicative of a relationship of the first pose with respect to the origin of the map;
determine a second reference pose;
based on the first data and the second reference pose, update the map of the physical space so that the map is relative to the second reference pose; and move the AMD in the physical space, based on the first data and on the map of the physical space.

2. The AMD of claim 1, wherein the one or more processors further execute the computer-executable instructions to:
determine, while connected to the dock and using the one or more sensors, second sensor data indicative of a second set of features of the physical space; and
determine, based on the second sensor data, that a confidence value associated with the first pose is less than a first threshold value;
wherein, based on the confidence value being less than the first threshold value, the one or more processors further execute the computer-executable instructions to move the AMD to the second pose.

3. The AMD of claim 1, wherein the one or more processors further execute the computer-executable instructions to:
determine that a confidence value associated with the second pose is greater than a first threshold value; and
responsive to the confidence value being greater than the first threshold value, the one or more processors execute the computer-executable instructions to determine the first data.

4. An autonomous mobile device (AMD) comprising:
one or more sensors;
one or more memories storing computer-executable instructions; and
one or more processors to execute the computer-executable instructions to:
determine a map of a physical space relative to a first reference pose;
determine a connection between the AMD and a dock;
retrieve, based on the connection to the dock, first data indicative of a first pose of the AMD;
determine, while connected to the dock and using the one or more sensors, first sensor data indicative of a first set of features of the physical space;
determine, based on the first set of features, second data indicative of a second pose of the AMD;
determine a variance between the first pose and the second pose;
determine that the variance exceeds a variance threshold;
based on the variance exceeding the variance threshold, determine that the dock has moved;
determine, based on the dock having moved, third data that is indicative of a first relationship of the second pose with respect to the first pose;
determine a second reference pose;
based on the third data, update the map so that the map is relative to the second reference pose; and
move, based on the third data and the map describing the physical space, the AMD to a third pose in the physical space.

5. The AMD of claim 4, wherein the one or more processors further execute the computer-executable instructions to:
determine, in a fourth pose and using the one or more sensors, second sensor data indicative of a second set of features of the physical space;
determine that the second set of features are indicative of the dock;
determine, based on the second sensor data, a first distance and a first direction from the AMD to the dock;
determine, based on the fourth pose and on the first distance and on the first direction, fourth data indicative of a fifth pose of the dock;
determine, based on the first pose and on the fifth pose, fifth data that is indicative of a second relationship of the first pose with respect to the fifth pose; and
move, based on the fifth data and on the map, the AMD in the physical space.

6. The AMD of claim 4, wherein the one or more processors further execute the computer-executable instructions to:
determine, in a fourth pose and using the one or more sensors, second sensor data indicative of a second set of features of the physical space, wherein the dock is within a field-of-view of the one or more sensors;
determine, based on the second sensor data, a first identifier associated with the dock;
determine, based on the first identifier, that the dock is associated with an origin of the map; and
wherein, based on the dock being associated with the origin of the map, the one or more processors execute the computer-executable instructions to determine the third data.

7. The AMD of claim 4, wherein the one or more processors further execute the computer-executable instructions to:
determine, at the third pose, user input indicating one or more of:
the dock has been moved, or
a description of where the dock is currently located;
determine, based on the user input, a path to the dock; and
move, based on the map and on the path, the AMD to the dock.

8. The AMD of claim 4, wherein the one or more processors further execute the computer-executable instructions to:
determine, based on the first pose and the third data, a fourth pose that is associated with the dock;
move the AMD to the fourth pose;
determine second sensor data associated with the fourth pose;
determine, based on the second sensor data, presence of the dock at the fourth pose; and
store the fourth pose as fourth data indicative of a location of the dock.

9. The AMD of claim 4, wherein the one or more processors further execute the computer-executable instructions to:
determine that a confidence value associated with the first pose is greater than a first threshold value;
wherein, based on the confidence value being greater than the first threshold value, the one or more processors execute the computer-executable instructions to determine the third data.

10. The AMD of claim 4, wherein the one or more processors further execute the computer-executable instructions to:
determine, at a fourth pose and using the one or more sensors, second sensor data indicative of a first object within the physical space; and
determine, based on the second sensor data and the fourth pose, first coordinates for the first object, wherein the first coordinates are relative to the map.

11. The AMD of claim 4, wherein the one or more processors further execute the computer-executable instructions to:

determine, based on the first pose and the third data, a fourth pose that is associated with the dock;
move the AMD to the fourth pose;
determine, based on the one or more sensors of the AMD at the fourth pose, second sensor data;
determine that the second sensor data is not indicative of the dock;
determine, based on the second sensor data not being indicative of the dock, that the dock has moved; and
move, based on the dock having moved, the AMD to a fifth pose.

12. The AMD of claim 4, wherein the one or more processors further execute the computer-executable instructions to:
determine, based on the first pose and the third data, a fourth pose that is associated with the dock;
move the AMD to the fourth pose;
determine second sensor data associated with a first location indicated by the first pose;
determine, based on the second sensor data not being indicative of the dock, that the dock has moved from the first pose; and
determine, based on the dock having moved from the first pose, user input indicating a location of the dock.

13. A method comprising:
determining a map of a physical space relative to a first reference pose;
retrieving first data indicative of a first pose within the physical space, wherein an origin for the map of the physical space is associated with the first pose;
moving a device in a first direction and a first distance from the first pose to a second pose;
determining, based at least on the first direction and the first distance, second data indicative of the second pose;
determining, at the second pose and using one or more sensors, first sensor data indicative of a first set of features of the physical space;
determining, based on the first set of features, third data indicative of a third pose;
determining a variance between the second pose and the third pose;
determining that the variance exceeds a variance threshold;
based on the variance exceeding the variance threshold, determining that a dock has moved;
determining, based on the dock having moved, fourth data that is indicative of a relationship of the first reference pose with respect to the third pose;
determining a second reference pose;
based on the fourth data, updating the map so that the map is relative to the second reference pose; and
moving, based on the fourth data and on the map, the device.

14. The method of claim 13, further comprising:
determining that a confidence value associated with the third pose is greater than a first threshold value; and
wherein the determining the fourth data is based on the confidence value being greater than the first threshold value.

15. The method of claim 13, further comprising:
determining, at a fourth pose and using the one or more sensors, second sensor data indicative of a first object within the physical space; and
determining, based on the second sensor data and the fourth data, first coordinates for the first object, wherein the first coordinates are relative to the map.

16. The method of claim 13, further comprising:
determining that the device is connected to the dock, wherein:
the dock is associated with the origin for the map, and
the first pose is retrieved responsive to the device being connected to the dock.

17. The method of claim 13, further comprising:
determining, at a fourth pose and using the one or more sensors, second sensor data indicative of a second set of features of the physical space;
determining that the second set of features is indicative of the dock;
determining, based on the second sensor data, a second distance and a second direction from the device to the dock;
determining, based on the fourth pose and on the second distance and on the second direction, fifth data indicative of a fifth pose for the dock;
determining, based on the first pose and on the fifth pose, sixth data that is indicative of a second relationship of the first reference pose with respect to the fifth pose; and
moving, based on the sixth data and on the map, the device in the physical space.

18. The method of claim 13, further comprising:
determining, based on second sensor data, a first identifier associated with the dock;
determining, based on the first identifier, that the dock is associated with the origin of the map; and
wherein the determining the fourth data that is indicative of the relationship of the first pose with respect to the third pose is based on the dock being associated with the origin of the map.

19. The method of claim 13, further comprising:
determining user input indicating one or more of:
the dock has been moved, or
a description of where the dock is located;
determining, based on the user input and the map, a path to the dock; and
moving the device to the dock.

20. The method of claim 13, further comprising:
determining, based on the first pose and the fourth data, a fourth pose that is associated with the dock;
moving the device to the fourth pose;
determining, while the device is proximate to the fourth pose, second sensor data;
determining, based on the second sensor data, presence of the dock at the fourth pose; and
storing the fourth pose as fifth data indicative of a location of the dock.

* * * * *